United States Patent
Kim et al.

(10) Patent No.: US 12,339,858 B2
(45) Date of Patent: Jun. 24, 2025

(54) MULTI-PARAMETER DATA TYPE FRAMEWORKS FOR DATABASE ENVIRONMENTS AND DATABASE SYSTEMS

(71) Applicant: Teradata US, Inc., San Diego, CA (US)

(72) Inventors: Sung Jin Kim, Buena Park, CA (US); Yinuo Zhang, Los Angeles, CA (US); Wellington Marcos Cabrera Arevalo, Cypress, TX (US); Rehana Rahiman, San Diego, CA (US); Mohamed Mahmoud Hafez Mahmoud Abdelrahman, Torrance, CA (US); Venkat Swamy Godi, Mountain House, CA (US)

(73) Assignee: Teradata US, Inc., San Diego, CA (US)

( * ) Notice: Subject to any disclaimer, the term of this patent is extended or adjusted under 35 U.S.C. 154(b) by 162 days.

(21) Appl. No.: 17/965,250

(22) Filed: Oct. 13, 2022

(65) Prior Publication Data
US 2024/0126771 A1    Apr. 18, 2024

(51) Int. Cl.
G06F 16/2458 (2019.01)

(52) U.S. Cl.
CPC .................. *G06F 16/2462* (2019.01)

(58) Field of Classification Search
CPC .................................... G06F 16/2462
USPC ............................................. 707/688
See application file for complete search history.

(56) References Cited

U.S. PATENT DOCUMENTS

| | | | |
|---|---|---|---|
| 10,545,984 B2* | 1/2020 | Zhang | G06F 16/221 |
| 11,556,514 B2* | 1/2023 | Raphael | G06F 16/221 |
| 11,586,616 B2* | 2/2023 | Sun | G06F 16/221 |
| 2018/0341689 A1* | 11/2018 | Zhang | G06F 16/221 |
| 2022/0237178 A1* | 7/2022 | Sun | G06F 16/221 |
| 2022/0300516 A1* | 9/2022 | Beier | G06F 16/2282 |

* cited by examiner

*Primary Examiner* — Michael Pham
(74) *Attorney, Agent, or Firm* — Ramin Mahboubian

(57) ABSTRACT

A multi-parameter data type framework can, among other things, provide a more comprehensive, systematic, and/or formal mechanisms for determining an appropriate data type for a data set. For example, the multi-parameter data type framework can be used to allow analytic tools to virtually automatically figure out an appropriate data type for a set of data values.

21 Claims, 7 Drawing Sheets

(ii) The first order key value is the output of the function of f(s1)=s1. The output is the same as the input. So, the first order key value is 0.

(ii) The second order key value is the output of the function of f(s3) = s3. The second order key value is 2.

(iii) The third order key value is the output of the function of f(c) = pos (c). The input of this function is a candidate data type (i.e., SMALLINT). The output is the position of SMALLINT in the candidate data type list, which is 1.

RESULT: (0, 2, 1)

Fig. 2B

I. SMALLINT For the 1st, the three order key values are 0, 2, 1 ii. INT For the 2nd, the three order key values are 90, 4, 2 iii. BIGINT For the 3rd, the three order key values are 95, 8, 3 iv. FLOAT For the 4th, the three order key values are 90, 4, 4.

v. DECIMAL For the 5th, the three order key values are 97, 30, 5.

vi. DATE mm-dd-yyyy For the 6th, the three order key values are 0, 4, 6.

vii. Date yyyy-mm-dd For the 7th, the three order key values are 0, 4, 7.

viii. CHAR For the 8th, the three order key values are 100, 42, 8.

ix. VARCHAR For the 9th, the three order key values are 100, 6.4, 9.

Fig. 2C i. VARCHAR (its three order key values are 100, 6.4, 9)

ii. CHAR (its three order key values are 100, 42, 8)

iii. DECIMAL (its three order key values are 97, 30, 5)

iv. BIGINT (its three order key values are 95, 8, 3)

v. INT (its three order key values are 90, 4, 2)

vi. FLOAT (its three order key values are 90, 4, 4)

vii. SMALLINT (its three order key values are 0, 2, 1)

viii. DATE mm-dd-yyyy (its three order key values are 0, 4, 7)

ix. DATE yyyy-mm-dd (its three order key values are 0, 4, 8)

Fig. 2D i.   For the 1st (i.e., DECIMAL), the order key value is 5.

ii.  For the 2nd (i.e., CHAR), the order key value is 8.

iii. For the 3rd (i.e., VARCHAR), the order key value is 9.

Fig. 2E i.   DECIMAL    (its order key value is 5)

ii.  CHAR       (its order key value is 8)

iii. VARCHAR    (its order key value is 9)

Fig. 2F i.   For the 1st (i.e., INT), two order key values are 4 and 2.

ii.  For the 2nd (i.e., BIGINT), two order key values are 8 and 3.

iii. For the 3rd (i.e., FLOAT), two order key values are 4 and 4.

iv.  For the 4th (i.e., VARCHAR), two order key values are 6.4 and 9.

Fig. 2G i.   INT        (its order key values are 4   and 2)

ii.  FLOAT      (its order key values are 4   and 4)

iii. VARCHAR    (its order key values are 6.4 and 9)

iv.  BIGINT     (its order key values are 8   and 3)

Fig. 2H

MULTI-PARAMETER DATA TYPE FRAMEWORKS FOR DATABASE ENVIRONMENTS AND DATABASE SYSTEMS

BACKGROUND

In the context of computing environments and systems, data can encompass virtually all forms of information. Data can be stored in a computer readable medium (e.g., memory, hard disk). Data, and in particular, one or more instances of data can also be referred to as data object(s). As it is generally known in the art, a data object can for example, be an actual instance of data, a class, type, or form data, and so on.

The term database can refer to a collection of data and/or data structures typically stored in a digital form. Data can be stored in a database for various reasons and to serve various entities or "users." Generally, data stored in the database can be used by the database users. A user of a database can, for example, be a person, a database administrator, a computer application designed to interact with a database, etc. A very simple database or database system can, for example, be provided on a Personal Computer (PC) by storing data on a Hard Disk (e.g., contact information) and executing a computer program that allows access to the data. The executable computer program can be referred to as a database program or a database management program. The executable computer program can, for example, retrieve and display data (e.g., a list of names with their phone numbers) based on a request submitted by a person (e.g., show me the phone numbers of all my friends in San Diego).

Generally, database systems are much more complex than the example noted above. In addition, databases have been evolved over the years and some databases that are for various business and organizations (e.g., banks, retail stores, governmental agencies, universities) in use today can be very complex and support several users simultaneously by providing very complex queries (e.g., give me the name of all customers under the age of thirty five (35) in Ohio that have bought all items in a list of items in the past month in Ohio and also have bought ticket for a baseball game in San Diego and purchased a baseball in the past 10 years).

Typically, a Database Manager (DM) or a Database Management System (DBMS) is provided for relatively large and/or complex databases. As known in the art, a DBMS can effectively manage the database or data stored in a database, and serve as an interface for the users of the database. A DBMS can be provided as an executable computer program (or software) product as is also known in the art.

It should also be noted that a database can be organized in accordance with a Data Model. Notable Data Models include a Relational Model, an Entity-relationship model, and an Object Model. The design and maintenance of a complex database can require highly specialized knowledge and skills by database application programmers, DBMS developers/programmers, database administrators (DBAs), etc. To assist in design and maintenance of a complex database, various tools can be provided, either as part of the DBMS or as free-standing (stand-alone) software products. These tools can include specialized Database languages (e.g., Data Description Languages, Data Manipulation Languages, Query Languages). Database languages can be specific to one data model or to one DBMS type. One widely supported language is Structured Query Language (SQL) developed, by in large, for Relational Model and can combine the roles of Data Description Language, Data Manipulation language, and a Query Language.

Today, databases have become prevalent in virtually all aspects of business and personal life. Moreover, database use is likely to continue to grow even more rapidly and widely across all aspects of commerce. Generally, databases and DBMS that manage them can be very large and extremely complex partly in order to support an ever increasing need to store data and analyze data. Typically, larger databases are used by larger organizations. Larger databases are supported by a relatively large amount of capacity, including computing capacity (e.g., processor and memory) to allow them to perform many tasks and/or complex tasks effectively at the same time (or in parallel). On the other hand, smaller databases systems are also available today and can be used by smaller organizations. In contrast to larger databases, smaller databases can operate with less capacity.

A popular type of database is the Relational Database Management System (RDBMS), which includes relational tables, also referred to as relations, made up of rows and columns (also referred to as tuples and attributes). Each row represents an occurrence of an entity defined by a table, with an entity being a person, place, thing, or other object about which the table contains information.

One important aspect of database systems is various database operations that they support and optimization of the database queries of the data stored in the database, as it is generally appreciated by those skilled in the art. One such database operation is generally known as a database Join operation (or "Join" as also may be referred to herein). For example, in a SQL environment, a SQL Join statement can be used to combine data or rows from two or more tables based on a common field between them. Different types of Joins include, INNER JOIN, LEFT JOIN, RIGHT JOIN and FULL JOIN. Simply put a Join operation can be used to effectively combine the information provided in database (e.g., as database tables) to address database quarriers. For example, in a database where a first database table provides information about students and their age, a second database table that provides information about the students and their favorite subjects and a third database that provides information about the students and their respective Grade Point Averages (GPA's), join operations can be suggestively applied to the tables to effectively join their information to address various database queries, including, for example, finding all the students that are age 19 with a GPA of 3.5 or higher that have "math" as their favorite subject, and so on.

A more recent development in database systems is the use of multi-processing computing or parallel computing system, especially Massively Parallel Processing (MPP) database systems that use a relatively large number of processing units to process data in parallel.

Another more recent development is the development of modern analytics (or data analytics) methods including, for example, statistical analytics, machine learning methods, discrete mathematics (e.g., graph analytics, deep learning). These modern analytics can be quite complex. As such, MPP database systems, among other things, are relatively much better suited for running (or executing modern analytics (or data analytics) methods.

Partly as a result of a number of more recent developments, there is an ever-increasing need for Relational Databases to process increasingly more and more data for various applications in many existing computing environments and systems. For example, today, in a number of existing database environments, there is a need to execute (or run)

thousands of database queries in parallel, or virtually simultaneously. Generally, managing access to data is an important aspect of computing systems. Managing data and access to data has become even more crucial today, especially for database systems that need to process more and more requests to access to data (e.g., database queries).

Even more recently, valuable data is generated and accumulated using relatively more economical mechanisms (e.g., a Cloud Data Store). At the same time, analyzing this same data stored in relatively cheap storage facilities and using the results of the analysis has become critical in various applications (e.g., success in business). As such, today, many analytic systems provide mechanisms intended to help data engineers and data scientists to fetch and analyze data.

In view of an ever-increasing need to process more and more data for various applications in many different computing environments and systems, improved database systems, especially Massively Parallel Processing (MPP) database systems, would be very useful.

SUMMARY

Broadly speaking, the invention relates to computing environments and systems. More particularly, the invention relates to improved techniques for management of data and databases.

A multi-parameter data type framework can be provided in accordance with one or more aspects. The multi-parameter data type framework, among other things, can effectively provide a more comprehensive, systematic, and/or formal mechanisms for determining an appropriate data type for a data set. The improved techniques can be used, for example, to allow analytic tools to virtually automatically figure out an appropriate data type for a set of data values (e.g., in a Teradata database environment, the techniques can be used for the "AutoSchema" functionality that creates a foreign table without schema specification in a "CREATE FOREIGN TABLE" statement, as it will be appreciated by those skilled in the art).

In one aspect, the multi-parameter data type framework can provide a multi-parameter data type model that can be used to, among other things, define (or formulate) and effectively use multiple statistical parameters and multiple selections parameters in connection with a set of data types defined for a data set (e.g., a set of candidate data types of the data set) in order to determine a data type for the data set (e.g., select an "appropriate," or "best" or "representative" data type for the data set). The determined data type can be used for various applications (e.g., building a relation for relational data types used by an analytics application).

In accordance with an exemplary embodiment, an appropriate data type can be determined systematically in consideration of multiple parameters, namely, "Coverage" (e.g., how many data values of a given data set can be stored using a particular data type) and "Space" (e.g., how much space would be required (or allowed) to save data values of a given data set in a particular data type). It should be noted that one or more preferences (e.g., user defined and/or provided preferences) can also be considered in accordance with one or more exemplary embodiments. For example, user preferences can be provided implicitly (e.g., based on an ordering of the data types in a set) and/or explicitly by one or more section (or control) preferences in accordance with one or more exemplary embodiments.

In accordance with another aspect, the processing required to select an appropriate data type can be Parallelized.

In accordance with yet another aspect, two or more "appropriate" data types can be reconciled in cases when data grows and/or data sets are joined together.

Still other aspects, embodiment and advantages will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIGS. 2B-2H also depict a multiple-parameter data type evaluator system (MPE), a set of (multiple-parameter) statistics (S) and a set of (multiple-parameter) data selection value parameters ($v_1$-$v_3$) for a data set (or set of data) (D) in a database environment in accordance with one exemplary embodiment.

DETAILED DESCRIPTION

Figure 1:
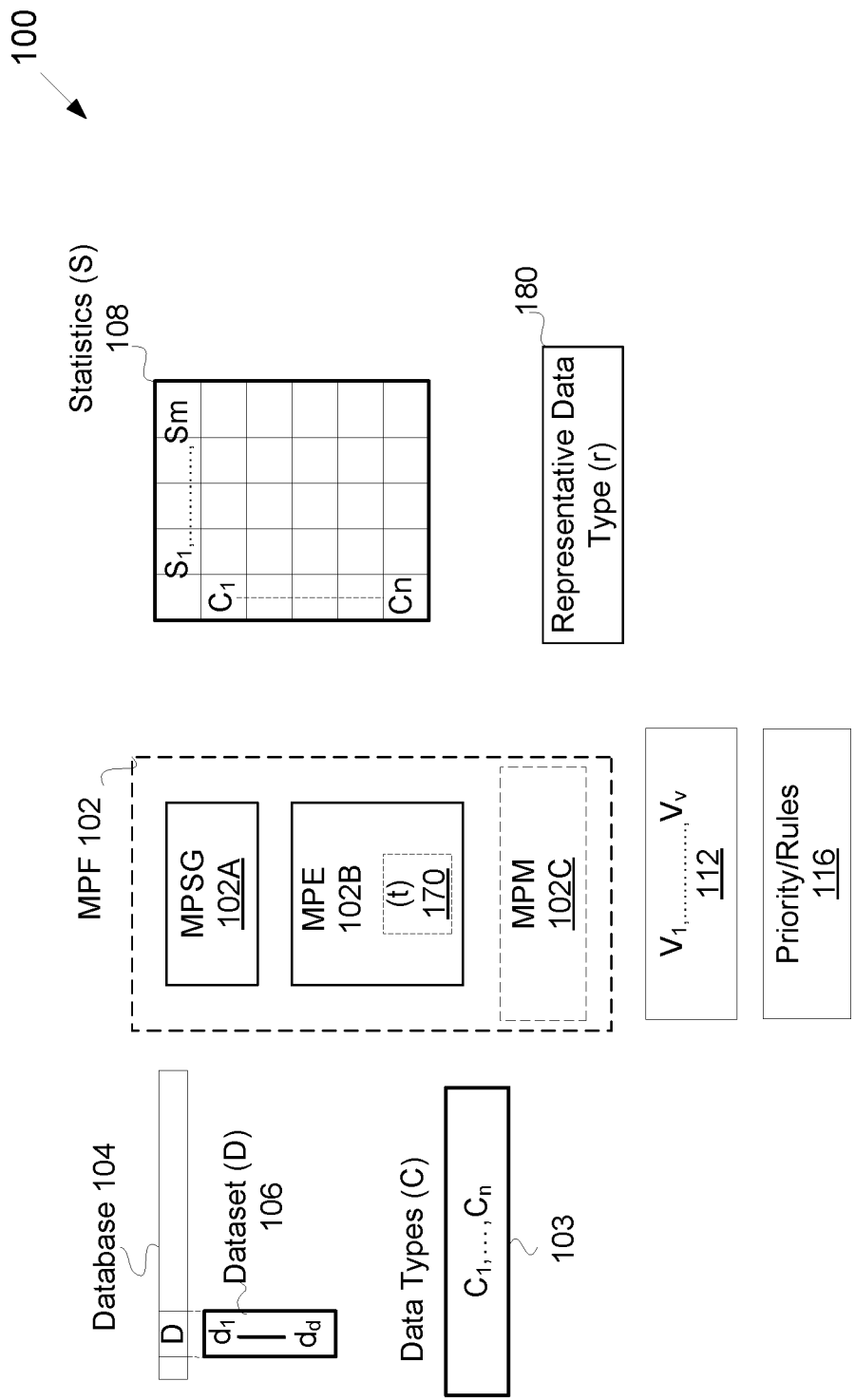
FIG. 1 depicts a multi-parameter data type (determination or representation) framework (MPF) in database computing environment in accordance with one embodiment.

As noted in the background section, in view of an ever-increasing need to process more and more data for various applications in many different computing environments and systems, improved techniques for management of data resulting in improved database systems, especially Massively Parallel Processing (MPP) database systems, would be very useful.

More specifically, today, valuable data is generated and accumulated in relatively more economical mechanisms (e.g., a Cloud Data Store). At the same time, analyzing the same data and using the results of the analysis has become critical for various applications (e.g., success in business). As such, today, many analytic systems provide mechanisms intended to help data engineers and data scientists to fetch and analyze data.

However, one persisting and challenging problem for many critical applications (e.g., data analytics) is determining an "appropriate" data type for a set of data values (e.g., a data set). For example, in an analytic system using a relational data model for a "CSV" file (e.g., a "comma-separated" values text file where information can be separated by comma) an "appropriate" data type has to be determined for the values of a field, so that a relation can be created with columns and data types. However, despite the prevalence of analytic systems, using a relational data model, and ever-increasing need to determine "appropriate" data types for ever-increasing data sizes, it appears that there is still a critical need for techniques that can provide a more-comprehensive, more formulated, and/or more feasible way to handle the challenges there today, and that are likely to become more difficult in near future given the general trend of growth of data storage and data analytics observed so far.

It should be noted that there may be existing techniques for finding a relational schema for "CSV-like" data by counting the count frequencies of possible data types for individual fields and then detecting a schema (roughly speaking, a set of data types for the fields) that can store rows as many as possible (see, for example, U.S. Pat. No. 10,331,633. 25, entitled: ""Schema discovery through statistical transduction", June 2019.") However, this and similar approaches would consider only frequency of data and may not present a more complete or comprehensive solution for at least some applications if not the vast majority of practical application that are available today and likely to be conceived in the near future in view of the current trends in a number of widely spread applications (e.g., data analytics).

In addition, existing approaches may not be poised to handle evaluation of data type in foreseeable feature (e.g., data type with more complex formats and size or length definitions, such as, for example, such as "decimal (10, 5)", "char (20)", "DATE (format 'MM-DD-YY')", and so on).

Also, in some programing environments, a mechanism (e.g., Pandas Data Frame) may be able to detect data types for individual fields of "CSV" data (e.g., "Pandas" as a library written for Python programming language for data manipulation and analysis). However, these approaches may be especially useful to a particular programing environment where, for example, a particular data type may effectively be given a higher preference in a predetermined way (e.g., "STRING" data type may be recommended as the appropriate data type given a data set even if the vast majority of data values in the data sets are of a different data type, say, for example, an "INTEGER" type). As a result, subsequent data processing mechanisms can fail to perform numeric processing as intended at least for some applications.

still other approaches to the extent that they have been published may use a case-by-case approach and/or require a significant amount of effort to formulate various expressions to detect an appropriate data type for a given data set.

In view of the existing approaches, it appears that there is still a need for techniques that can provide a more-comprehensive, more formulated, and/or more feasible way to handle challenges there are faced today, and are likely to become even more difficult in the near future given the general trend of growth of data storages and data analytics observed in recent years.

As such, it will be appreciated a multi-parameter data type framework can be provided in accordance with one or more aspects. The multi-parameter data type framework, among other things, can effectively provide a more comprehensive, systematic, and/or formal mechanisms for determining an appropriate data type.

In one aspect, the multi-parameter data type framework can provide a multi-parameter data type model that can be used to, among other things, define (or formulate) and effectively use multiple statistical parameters and multiple selections parameters in connection with a set of data types defined for a data set (e.g., a set of candidate data types of the data set) in order to determine a data type for the data set (e.g., select an "appropriate," or "best" or "representative" data type for the data set). The determined data type can be used for various applications (e.g., building a relation for relational data types used by an analytics application).

In accordance with an exemplary embodiment, an appropriate data type can be determined systematically in consideration of multiple parameters, namely, "Coverage" (e.g., how many data values of a given data set can be stored using a particular data type), and "Space" (e.g., how much space would be required (or allowed) to save data values of a given data set in a particular data type). It should be noted that one or more preferences (e.g., user defined and/or provided preferences) can also be considered in accordance with one or more exemplary embodiments. For example, user preferences can be provided implicitly (e.g., based on an ordering of the data types in a set) and/or explicitly by one or more section (or control) preferences in accordance with one or more exemplary embodiments.

In accordance with another aspect, the processing of computation required to select an appropriate data type can be Parallelized.

In accordance with yet another aspect, two or more "appropriate" data types can be reconciled in cases when data grows and/or data sets are joined together.

It will be appreciated, improved techniques provided in accordance with one or more embodiments, can be used, for example, to allow analytic tools to virtually automatically figure out an appropriate data type for a set of data values (e.g., in a Teradata database environment, the techniques can be used for the "AutoSchema" functionality that creates a foreign table without schema specification in a "CREATE FOREIGN TABLE" statement, as it will be appreciated by those skilled in the art).

Embodiments of some aspects of the improved techniques are also discussed below with reference to FIGS. 1-5. However, those skilled in the art will readily appreciate that the detailed description given herein with respect to these figures is for explanatory purposes as the invention extends beyond these limited embodiments.

FIG. 1 depicts a multi-parameter data type (determination or representation) framework 102 (MPF) in database computing environment 100 in accordance with one embodiment. As it will be discussed in greater detail below, the (MPF) 102 can be used to systematically determine an appropriate data type for data (e.g., a dataset (D) 106 stored in a database 104) useful for various database systems and applications (not shown), including for example, analytic systems and applications using relational databases (e.g., relational databases using relations that can be created with rows and columns of a database table using various data types).

In the example depicted in FIG. 1, multi-parameter data type (determination or representation) framework (MPF) 102 is depicted to include two (2) separate systems, namely, a multi-parameter data type statistics generation system (MPSG) 102A, and a multi-parameter data type evaluator system (MPE) 102B, in order to facilitate a general understanding. However, it will become readily apparent to those skilled in the art that multi-parameter data type framework (MPE) 102 can, for example, be implemented as a single computing system, or it can be further subdivided into additional components (more than two) depending on the underlying computing systems and/or various applications. In addition, the multi-parameter data type framework (MPE) 102 can be provided to include various other components, including, for example, a multi-parameter modeling system (102 C) as depicted in FIG. 1.

Referring to FIG. 1, as noted above, the multi-parameter data type determination framework (MPF) 102 can be represented to include a multi-parameter data type statistics generation system (MPSG) 102A, and a multi-parameter data type evaluator system (MPE) 102B. As also noted above, the multi-parameter data type determination framework (MPF) 102 can be implemented in a database computing environment 100 that also includes a database 104. As such, either one, or both, one of the multi-parameter data type statistics generation system (MPSG) 102A and multi-parameter data type evaluator system (MPE) 102B can, for example, be provided as, or in, a database management system (or database manager) (not shown) operable to access and process data in the database 104, as it will readily be appreciated by those skilled in the art. In other words, data type determination framework (MPF) 102 can, in part, or entirely, be provided in an enhanced database management system in accordance with one or more embodiments.

In any case, the database 104 can include and/or store various data sets (or sets of data), including a data set (D) 106, as depicted in FIG. 1. It should be noted that the data set (D) 106 can include multiple individual data components (or data components) ($d_1$-dd). For example, the data set (D) 106 can include a set of values (or data values) that can be represented as: {"1.2", "Seattle", "0.122," Aug. 8, 2008, "Open", ... }" and stored in a database table of a relational database. It should be noted that each one of the data components ($d_1$-$d_d$) of the data set (D) 106 can have, or can be designated to have, and/or can be assigned, to at least one data type (c) in a set of data types (C) 103 that includes multiple data types ($c_1$-$c_n$) (e.g., INT, FLOAT, CHAR) as it will be readily appreciated by those skilled in the art. Typically, the set of data types (C) 103 can be defined for all of the data in the database 104, but it may have been specifically defined for the data set (D) 106.

Generally, for practical purposes, the size of the data set (D) 106 is relatively large, rendering it very difficult, if not impossible, to determine an appropriate, "best," or an representative data type, for it in an acceptable time frame, especially if solely relying on human ability (e.g., to have data scientist or database administer review the data to determine an appropriate or representative data type) let alone that the data set (D) 106 can change over time, typically, getting even larger in size. As such, it will be appreciated that the data type determination framework (MPF) 102 can also provide a more systematic solution to set of prevailing problems presented in database systems with respect to determining an appropriate data type to represent, especially, in complex analytics systems that need to analyze data sets with an ever-increasing size and complexity. In doing so, the multiple-parameter data type statistics generation system (MPSG) 102A can generate statistics (S) 108 for the data set (D) 106. Moreover, it should be noted that generated statistics (S) 108 can include multiple data (statistical) parameters ("statistical parameters") associated with each one of the multiple data types ($c_1$-$c_n$) defined in the defined set of data types (C) 103. It should be noted that the statistical parameters in the generated statistics (S) 108 and/or the defined set of data types (C) 103 can, for example, be modeled based on, and/or modeled by using, the multi-parameter modeling system (MPM) 102C. As such, statistical parameters in the generated statistics (S) 108 and/or the defined set of data types 103 (C) can also be part of the data type determination framework (MPF) 102 even though they are depicted as such in FIG. 1. In any case, the statistical parameters associated with defined set of data types 103 (C) are represented as statistical values parameters, i.e., multiple-parameter statistical values ($s_1$-$s_m$) in the set of statistics (S) 108 as will be discussed in greater detail below.

Using the data sets (D) 106 as an example (depicted in FIG. 1) the multi-parameter data type statistics generation system (MFGE) 102A can generate multiple-parameter statistical values ($s_1$-$s_m$) for types for the data set (D) 106 (e.g., frequency of occurrence of data types (or coverage), max size (or space) of the data type, average size of a data type) in the set of statistics (S) 108. More specifically, the set of statistics (S) 108 can be generated by the multi-parameter data type statistics generation system (MPSG) 102A as a multiple-parameter data type statistical representation, such that it includes multiple-parameter statistical values ($s_1$-$s_m$) for each one of multiple data types ($c_1$-$c_n$) in the set of data types (C) 103 defined for the data set (D) 104 of the database 106. For example, a particular data type ($c_1$) can be represented as having a frequency of occurrence (or coverage) of 47 percent in the data set (D) 106 using a first parameter ($s_1$), a max size of eight (16) bytes in the data set (D) 106 using a second parameter ($s_2$), an average size of 8.9 bytes in the data set (D) 106 using a third parameter ($s_3$), and so on.

As noted above, the multi-parameter data type determination framework (MPF) 102 can also include a multi-parameter modeling system (MPM) 102C. The MPM 102C can provide a more formal, comprehensive and/or systematic mechanism for defining the multiple-parameter statistical values ($s_1$-$s_m$). More generally, the multiple parameter modeling component (MPM) 102C can be used to more formally define multiple data types ($c_1$-$c_n$) in the set of data types (C). As such, one or more of the multiple data types ($c_1$-$c_n$) in the set of data types (C) can be defined to also include one or more data parameters. For example, each one of the multiple data types ($c_1$-$c_n$) can also be defined with have multiple parameters (e.g., a data type modeling definition with three (3) parameters: (i) a data type class, (ii) a data type format, and (iii) a data type maximum size).

In other words, a data type in a set of data types can be defined more formally and based on multiple parameters (a "multi-parameter" data type (formally) defined). Additionally, multiple (statistical) parameters can be defined for a data type and their corresponding values can be determined with respect to a data set or an entire database (e.g., by statistical analysis performed for a particular data set (D) 106 and/or database 106). As such, when the multiple-parameter data type statistics generation system (MPSG) 102A generates the statistics (S) 108 for the data set (D) 106, determined (or (e.g., measured) statistical parameter values corresponding to a set of determined (e.g., selected parameters of interest) can be assigned to a defined "multi-parameter" data type.

In other words, the multi-parameter modeling system (MPM) 102C can be used to generate the set of statistics (S) 108 with multiple data parameters in a systemic and/or (more) formal manner. The set of statistics (S) 108 can, in turn, allow multiple data type parameters values ($s_1$-$s_m$) to be considered in the multi-parameter data type determination framework 102, where another component of the multiple parameter data type framework (MPF) 102, namely, the multi-parameter data type evaluator system (MPE) 102B can use the multiple data type parameters values ($s_1$-$s_m$) to determine an appropriate data type for a given data set, namely the dataset (D) 106 in the exemplarily embodiment depicted in FIG. 1.

More generally, the multi-parameter data type evaluator system (MPE) 102B can use the multiple data type parameters values ($s_1$-$s_m$) to determine at least one appropriate data for the data or any data set(s) stored and/or associated with the database 104, based on multiple data type parameters, and in a manner that could also allow determination of the at least appropriate data type in consideration of multiple preferences and/or requirements of a particular user, system, and/or application.

More particularly, referring back to FIG. 1, the multi-parameter data type evaluator system (MPE) 102B can obtain the set of statistics (S) 108 associated with data set (D) 106 to determine an appropriate data type for the data set (D) 106 based on (or in consideration of) multiple selection value parameters ($v_1$-$v_n$) 112. By way of example, the multiple selection value parameters ($v_1$-$v_n$) 112 can, for example, be provided for the selection of one or more target (or candidate) data types from the set of data types (C) defined for the data set (D) 106 of the database 104, such that each one of the selection value parameters 112 ($v_1$-$v_v$) is defined with respect to at least one of the multiple-parameter statistical values ($s_1$-$s_m$). For example, a selection value parameter $v_1$ can be a value provided based on a parameter ($s_1$) indicative of a measured statical frequency of occurrence of a data type (e.g., a frequency of occurrence equal or greater than fifty-one (51) percent to indicate a preference for consideration or selection data types with frequencies of occurrence that are equal or greater than fifty-one (51) percent).

As another example, another selection value parameter $v_2$ can be a value provided based on another statistical parameter ($s_2$) indicative of a maximum size of data types, for example, to indicate a preference for consideration, or selection, of data types that do not exceed a particular maximum size value (e.g., a maximum allocation space not exceeding thirty-two (32) bytes).

In other words, each one of the individual data components of the data set (D) 106 ($d_1$-$d_d$) can be associated with at least one data type (c) selected from the set of types (C) defined for the data set (D) of the database. A selected data type (c) can also be associated with multiple statistical parameters values ($s_1$-$s_m$) as determined (e.g., measured, predicated) for the data set (D) 106. In addition, each one of the selection value parameters 112 ($v_1$-$v_v$) can be defined with respect to at least one of multiple statistical parameters represented (or quantified with values) by the multiple-parameters statistical values ($s_1$-$s_m$). As such, the multi-parameter data type evaluator system (MPE) 102B can effectively use the selection value parameters 112 ($v_1$-$v_v$) to determine at least one target or candidate data type (t) 120 (e.g., select one or more target data types from the data types ($c_1$-$c_n$) in the set of data types (C) defined for the data set (D) of the database and represented in the set of statistics (S) 108). In doing so, the multi-parameter data type evaluator system 102B can obtain (e.g., receive as input, retrieve, search, lookup, determine) the set of statistics (S) 106 including the multiple-parameter statistical values ($s_1$-$s_m$) associated with set of data types (C) defined for the data set (D) of the database, in addition to also obtaining a set of (multi-parameter) selection value parameters ($v_1$-$v_v$) 112. Typically, it is desirable at least for some applications to provide the multiple-parameter statistical values ($s_1$-$s_m$) as user-defined value, and/or values provided by as input by an entity (e.g., database administrator, data scientist, end user of an analytics application). In any case, the multi-parameter data type evaluator system (MPE) 102B can effectively apply a provided selection value parameters 112 ($v_1$-$v_v$) to its corresponding(s) parameter value(s) of the multiple parameter statistical values ($s_1$-$s_m$) in the statistics (S) in order to determine one or more target data types (t). For example, the multi-parameter data type evaluator system (MPE) 102B can select one or more target data types (t) that satisfy a condition expressed by a provided selection value parameter to select one or more target data types (t). In other words, the MPE 102B can, for example, effectively eliminate from consideration one or more of data types of the set of data types (C) to select one or more target data types (t) for the data set (D) 106 by applying the selection value parameters 112 ($v_1$-$v_v$) to the statistical values ($s_1$-$s_m$) in the statistics (S)

More generally, the multi-parameter data type evaluator system 102B can ultimately determine an output as at least one representative data type 180 (r) for the data set (D) 106 of the database 104. By way of example, the at least one representative data type 180 (r) that is outputted can be determined (e.g., selected) based on the one or more selected target data types 170 (t), the multi-parameter data type evaluator system 102B can determine an output a representative data type for the data set (D) 106 of the database 104. Of course, the least one representative data type 180 (r) can simply also be the target data types 170 (t). The representative data type 180 (r) is used herein to indicate the datatype(s) that are untimely outputted by the data type evaluator system (MPE) 102B.

It should be noted that the data type evaluator system (MPE) 102B can determine as its output at least one representative data type (r) that includes multiple representative data parameters (in addition to a representative data type) thereby, providing a multi-parameter representation of the data set (D) 104 based on multiple data parameters.

In doing so, the parameter data type evaluator system (MPE) 102B can also apply one or more rules and/or priorities to one or more selected target data types 170 (t).

Referring to FIG. 1, for simplicity, the one or more rules and/or priorities 116 are depicted separately from the selection value parameters 112 ($v_1$-$v_v$) but it should be noted that the one or more rules and/or priorities 116 can also, for example, be provided explicitly by the one or more rules and/or priorities expressed by the value parameters ($v_1$-$v_v$) (e.g., defining them to resolve potential ties between multiple selected target types and selection of a default type in cases where no target data type can be selected after the application of the selection value parameters 112 ($v_1$-$v_v$)), or implicitly by the one or more rules and/or priorities the selection value parameters 112 ($v_1$-$v_v$) (e.g., based on a defined order or ordering of the value parameters ($v_1$-$v_n$). Generally, the selection value parameters 112 ($v_1$-$v_v$) can be effectively used (e.g., applied) by the data type evaluator system (MPE) 102B to the multiple-parameter statistical values ($s_1$-$s_m$) associated with set of data types (C) defined for the data set (D) of the database, to determine and output at least one representative data type 120 (r) that may also include representative data parameters to effectively output a representative data type (e.g., an appropriate data type, "best data type) for the data set (D) of the database. For example, in accordance with one exemplary embodiment that will be described in greater detail (shown in FIG. 2), three (3) selection (or control) parameters can be defined formally for a data type as: (i) a minimum coverage threshold (e.g., a minimum frequency of occurrence of a data type in a data set) (ii) a maximum space threshold (e.g., average size of a data type in a data set), and (iii) a rule or order of priority (e.g., an Order Key List as a list of functions where candidate data types can be sorted, and element in the order key list can be modeled as a scoring function, and an indicator of ascending/descending order). However, for simplicity, the operations of the multi-parameter data type evaluator system (MPE) 102B are initially discussed in more general terms before providing another exemplary embodiment that would describing more exemplary operations in greater detail.

Referring back to FIG. 1, by way of example, the multiple parameter data type evaluator system (MPE) 102B can apply a first obtained selection value parameter ($v_f$) of the multiple selection value parameters 112 ($v_1$-$v_v$) to a first one ($s_g$) of the obtained multiple-parameter statistical values ($s_1$-$s_m$) associated with each one of the multiple data types ($c_1$-$c_n$) in the set of data types (C) defined for the data set (D) of the database. In other words, MPE 102B can effectively test a condition expressed by the selection value parameter ($v_f$) by considering the statistical value ($s_g$) provided for each one of the multiple data types ($c_1$-$c_n$). As a result, the (MPE) 102B can, for example, identify one of more of the multiple data types ($c_1$-$c_n$) in the set of data types (C) as target data type(s) (t) 170 (shown in FIG. 1). If more than one (1) target data type (t) 170 has been selected and it is desirable to select only one (or the "best") data type, then, the MPE 102B can continue to apply a second selection value parameter (vs) of multiple selection value parameters 112 ($v_1$-$v_n$) to a second one ($s_s$) of the multiple-parameter statistical values ($s_1$-$s_m$) associated with each of the multiple data types ($c_1$-$c_n$) in the set of data types (C) defined for the data set 106 (D) of the database 104. In the example, if still more than one (1) target data type (t) 120 remains, then, the MPE 102B can further continue to apply one or more rules to determine one of the multiple identified target data types 170(t) as the representative data type (r) 180. As noted above, for example, one or more priority and/or ordering rules can be effectively provided. In the example, one or more priority and/or ordering rules can be effectively provided as a third selection value parameter ($v_t$) of the multiple selection value parameters 112 ($v_1$-$v_n$). More generally, based on one or more selected target data types 170 (t), a representative data type (r) 180 can be ultimately determined and output by the MPE 102B as an appropriate or representative data type for the data set (D) 106 of the database 140. In determining the representative data type (r) 180, the MPE 102B can also determine one or more representative data parameters ($r_1$-$r_r$) and generate the representative data type (r) 180 to include the one or more representative data parameters ($r_1$-$r_r$) as one or more parameters associated with a representative data type or data class (e.g., "<VARCHAR,,42, 0>") as will discussed below with respect another exemplary embodiment depicted in FIG. 2.

Figure 2:
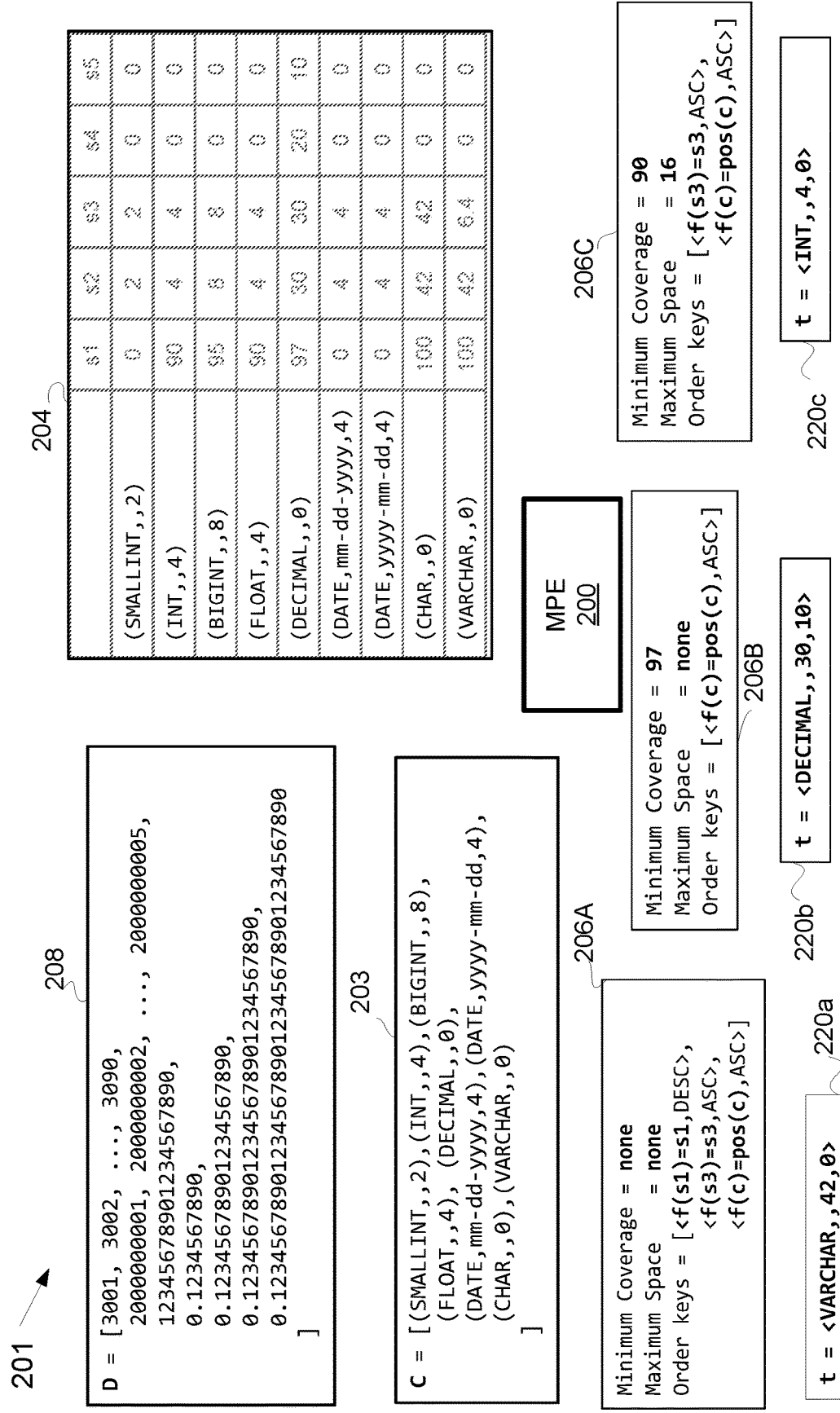
FIG. 2 depicts a multiple-parameter data type evaluator system (MPE), a set of (multiple-parameter) statistics (S) and a set of (multiple-parameter) data selection value parameters ($v_1$-$v_3$) for a data set (or set of data) (D) in a database environment in accordance with one exemplary embodiment.

To further elaborate, FIG. 2 depicts a multiple-parameter data type evaluator system (MPE) 200, a set of (multiple-parameter) statistics (S) 204 and a set of (multiple-parameter) data selection value parameters ($v_1$-$v_3$) 206 for a data set (or set of data) (D) 208 in a database environment 201 (database not shown) in accordance with one exemplary embodiment. Similar to the multiple-parameter data type evaluator system (MPE) 102B (Shown in FIG. 1), generally, the selection value parameters 112 ($v_1$-$v_3$) can be effectively used (e.g., applied) by the multiple-parameter data type evaluator system (MPE) 200 in connection with the multiple-parameter statistical values ($s_1$-$s_5$) associated with each one of the data types ($C_1$-$C_9$) in the set of data types (C) 203 defined for the data set (D) 208, to determine and output a representative data type 220 that may also include representative data parameters, to effectively determine an appropriate data type for the data set (D) 208 of a database. More particularly, FIG. 2 depicts in greater detail a set of exemplary selection value parameters ($v_1$-$v_3$) 206 to discuss in greater detail the exemplary operations that can be performed by a multiple-parameter data type evaluator system (MPE), namely MPE 200.

However, initially, it should be noted that FIG. 2 also depicts a set of data types (C) 203 to also further elaborate on a data model that can be defined and used to facilitate a more formal and/or systematic solutions to the problems associated with finding an appropriate data type for a data (or a data set) in accordance with one aspect. A such, a number of concept and notation will be discussed before discussing a number of exemplary operations that can be performed by the multiple-parameter data type evaluator system (MPE) 200.

Exemplified Multi-Parameter Data Type Model Definitions and Notations

In the example shown in FIG. 2, a data model can be exemplified by using three (3) conceptual elements, namely, (i) Data Set (D) 208, (Candidate) Data Types in a set of data types (C) 203 and an appropriate data type(s) that can be expressed as a target data type "r" or outputted representative data type "t" (or ultimate target data type (t)) in accordance with one embodiment.

The first conceptual element, namely, Data Set (D) 208 can be relatively easy to model and/or formulate. As shown in FIG. 2, a data set (D) 208 can be formally defined and represented as list of data values, for which, for example, a "best" (or most appropriate, or most suitable, or most representative) data type is ultimately sought. Generally, a "data set D" is not an empty set, and "|D|" can represent the total number of values in D.

In the example depicted in FIG. 2, the second conceptual element is Candidate Data Types (C) represented as a list of candidate data types, for example, for a target application and/or system. In this example, nine (9) data types are provided in the list of candidate data types: [(SMALLINT,, 2), (INT,,4), . . . , (VARCHAR,,0)]. In addition, it should be noted that on this example each candidate data type is modeled to have three (3) components: (i) a data type class indicative of a classification specifying the type of data or type of values, (ii) a data type format indicative of the manner of representation or format, and (ii) a data type size indicative of the amount of space needed (in bytes for this example) to store a value. Generally, it should be noted that a data type (e.g., an INTEGER) can have deterministic data sizes that are not adjustable, while another data type (e.g., a STRING) may not have a deterministic size, but its maximum size may have to be determined in consideration of the data required to be handled. For non-deterministic data types, the data type size can be represented, for example, as Zero (0).

It should also be noted that that Candidate Data Types C 203 can be defined specifically for a target computing system, for example, depending on the data types supported by the target data system. As an example, in a system that supports three (3) different data types of: "int64, float64, and string," a Candidate Data Types C (e.g., Candidate Data Types C 208) can be represented as: {(int64,,8), (float64,,8), (string,,0)}. typically, relatively more complex computing and/or database systems would have more target data types of interest. For example, in a database environment supported by Teradata, Candidate Data Types C can be defined as (BYTEINT,,1), (SMALLINT,,2), (INT,,4), (FLOAT,,4), (DECIMAL,,0), (DATE,dd-mm-yyyy,4), (DATE,yyyy-mm-dd,4), . . . , (CHAR,,0), (VARCHAR,,0)]. It should also be noted that the position of a candidate data type in Candidate Data Types (C) can also be designated to represent a relative preference and/or importance among the candidate data types when multiple candidate data types can be used for D, for example, based on expressed values parameters data selection value parameters ($v_1$-$v_3$) 206.

The third (3$^{rd}$) and last conceptual exemplary element discussed with respect to the example shown in FIG. 2 is the best data type for D (r) (or (t), both can be used interchangeably herein with (r) generally indicative as an out or final result.) For example, as a "best" data type for D, (r) can be defined in a target application and/or computing system (i.e., defined in the scope of Candidate Data Types C). In the example depicted in FIG. 2, the best data type for D, denoted as (r), can be modeled to include four (4) components: (1) data type class, (2) data type format, (3) data type max size, (4) data type fractional length. The first two components can be virtually the same as the first two defined with respect to a candidate data type in the set of data types C 103. However, the third component of the "best" data type for D, denoted as (r), can be defined to consider only the data set D in the scope of Candidate Data Types C 103. The third component of a candidate data type in C need not be specific to D but to all possible values for a target computing system. The fourth component of the "best" data type for D, denoted as (r), can be defined to be applicable to one or more particular data type classes that, for example, deal with fractional digits (e.g., a DECIMAL data type class as it may be provided and supported, for example, by a Teradata database management system, and by various other database management systems.

Exemplified Multi-Parameter Statistics Collection and Generation

Next, collection and generation of the set of (multiple-parameter) statistics (S) 204 (depicted in FIG. 2) is discussed. Although not shown in FIG. 2, the statistics (S) 204 can, for example, be collected and/or generated by the multiple-parameter data type statistical generation system (MPSG) 102A (Shown in FIG. 1). Referring to FIG. 2, statistical parameters ($s_1$, $s_2$, $s_3$, $s_4$, and $s_5$) can be collected for each one of multiple candidate data types that can be defined based on the Candidate Data Types C as discussed above.

The collection of statistical values for the statistical value parameters ($s_1$, $s_2$, $s_3$, $s_4$, and $s_5$) can, for example, be done in one-pass scan of data type D, as it will be readily appreciated by those skilled in the art. In addition, regular expressions and/or rules can be used to test if a value matches a candidate data type (i.e., increasing the first statistic). Identifying appropriate regular expressions and rules can depend on a target application and/or computing system, as it will be readily appreciated by those skilled in the art. For example, Teradata database systems can use one regular expression for "BYTEINT/SMALLINT/INT/BIGINT/FLOAT/DECIMAL" and distinguish "BYTEINT/SMALLINT/INT/BIGINT" from "FLOAT/DECIMAL by a "dot" character. The frequency of a candidate data type can be increased, for example, based on a range rule, such as "$-128<=d<=127$ for BYTEINT", "$-32768<=d<=32767$ for SMALLINT", and so on. In effect, there can also be interactions among the collected statistical parameter values. For example, first, the last four statistical value parameters ($s_2$, $s_3$, $s_4$, $s_5$,) in statistics 204 can be designated to be collected only when the first statistical value parameter ($s_1$) is increased (not shown). Second, for a given value of a data component (d) in the data set D 208, the first statistical value parameter ($s_1$) can be designated to not be increased if one or more of the statistics statistical value parameters ($s_4$, $s_5$,) have to be increased and the sum of s4 and s5 would exceed an internal system limit (not shown).

Referring to FIG. 2 again, the statistical value parameters ($s_1$, $s_2$, $s_3$, $s_4$, $s_5$) can be defined as follows:

$S_1$: Frequency defined as the number of data values in the data set D matching a datatype (c).

$S_2$: Maximum Length defined as the maximum length of a datatype (c) in in the data set D. It can be collected for candidate data types with data type sizes that are not determined in C (e.g., DECIMAL, CHAR, VARCHAR in Teradata database environment). Otherwise, it can be set to data type size that has been already determined or pre-determined.

$S_3$: Average length (or Size) defined as an average length (or Size) of a datatype (c) in in the data set D. It can be collected for variable-length candidate data types (e.g., VARCHAR in Teradata). It can also take into account a system space overhead to maintain a variable length data. For example, a database environment (e.g., Teradata database environment) may require one (1) additional byte to store a "VARCHAR" data. For fixed-length data types, it can be the same as the maximum length ($S_2$). It should be noted that for fixed-length data types with sizes are not determined in C (e.g., DECIMAL and CHAR in Teradata database environment), the average length can be set to be the same as the maximum length.

$S_4$ can be defined as Maximum digits before a decimal point. It can be set to Zero (0) for data types that do not include fractional numbers.

$S_5$ can be defined as Maximum digits after a decimal point. Similarly, it can be set to Zero (0) for data types that do not include fractional numbers.

Exemplified Multi-Parameter Selection (or Control) Values

Referring still to FIG. 2, in addition to the statistical value parameters ($s_1$, $s_2$, $s_3$, $s_4$, $s_5$) discussed above, a set of multi-parameter selection (or control) parameters can be defined. It should be noted that the multi-parameter selection parameters can be assigned values to effectively control the selection of an appropriate, or most appropriate, or best data type for a particular data set, database, application, and/or computing system. As such, selection (or control) parameters can effectively control the decision making in selecting a best (or most representative) data type for a data set, database, application, and/or computing system.

For example, with reference to the exemplary embodiment depicted in FIG. 2, three (3 selection (or control) parameters can be defined as follows:

(i) Minimum Coverage Threshold can be used to effectively disqualify candidate data types with coverages (or frequencies) that are less than a determined or predetermined threshold. The coverage of c can be computed, for example, as "the frequency" (i.e., s1) divided by |D|.

(ii) Maximum Space Threshold can be used to disqualify candidate data types with average space requirements greater than a determined or predetermined threshold. This threshold can, for example, be applied to statistic parameter of an average length (i.e., $s_3$).

(iii) Order Key List can be defined as a list of functions used to store the candidate data types. An element in an Order Key List can, for example, be modeled as a "scoring function" and an indicator indicative of an ascending or descending order. In addition, a "scoring function" can be defined with the collected statistics and the list of candidate data types C. A relatively simple example is the function f(s3)=s3. Another simple function is f(c)=pos(c), where "pos( )" represents the position of c in C. Multiple factors can be used for a single "scoring function," for example, "f(s1, s3)=0.8*(s1/|D|)+0.2*max(0,(50−s3))/100," where 0.8 and 0.2 are indicative of a relative degree of important between statistical parameters $s_1$ and $s_3$, where "max (0,(50−s3))" indicates the largest size in consideration (i.e., do not distinguish data types with sizes greater than 50).

Exemplified Multi-Parameter Selection Decision Making Using Simple Examples

As noted above with reference to FIG. 2, the selection value parameters ($v_1$-$v_3$) can be effectively used (e.g., applied) by the multiple-parameter data type evaluator system (MPE) 200 in connection with the multiple-parameter statistical values ($s_1$-$s_5$) associated with each one of the data types ($C_1$-$C_9$) in the set of data types (C) 203 defined for the data set (D) 208 of a database, in order to determine and output a representative or target data type 220 that may also include data parameters to effectively output a representative data type (r) for the data set (D) of the database.

Having now discussed (i) a number of conceptual elements and definitions of an exemplary multi-parameter data type modeling, (ii) collection of multi-parameter statistics with multiple statistical parameters that can also be defined formally and systematically using a multi-parameter data type modeling (iii), as well as (iv) multi-parameter selection (or control) parameters that can also be defined formally and systematically using a multi-parameter data type modeling, the operations of the data type evaluator system (MPE) 200 with respect to selection of target data types and ultimately selecting the best data type is discussed in greater detail below using the exemplary statistical parameters and selection parameters discussed above.

Referring back to FIG. 2, as noted above, using a formalized data modeling scheme, Data Types (C) 203 can be defined as nine (9) data types represented as: "C={(SMALLINT,,2),(INT,,4),(BIGINT,,8),(FLOAT,,4),(DECIMAL,,0), (DATE,mm-dd-yyyy,4),(DATE,yyyy-mm-dd,4),(CHAR,, 0),(VARCHAR,,0)}".

For example, a data scientist may need to analyze a large data set D 208 (shown only partially in FIG. 2) that has one hundred (100) thousand, or even one hundred million (100, 000,000) data values useful for a particular data analytical application. It will be appreciated that a multi-parameter data type (determination or representation) (MPF) framework (e.g., MPF 102 shown in FIG. 1) can be used by or on behalf of the data scientist to automatically determine an appropriate data type for the data set, in accordance with one embodiment.

Referring to FIG. 2, it should be noted a multi-parameter data type (determination or representation) (MPF) framework is depicted only in part, and includes the Definitions of D 208 and C 203, as well as Multi-parameter Statistics 204 with multiple data type parameters values ($s_1$-$s_5$) and there (3) selection parameters values ($S_1$-$S_3$) ($S_1$:Maximum Coverage, $S_2$: Minimum Space, and $S_3$: Oder Keys). In fact, to elaborate further, FIG. 2 depicts, three (3) different sets of selection parameters 206A, 206B and 206C (each having the same (3) selection parameters (Maximum Coverage, Minimum Space, and Oder Keys). Each one of the sets of selection parameters values (206A, 206B and 206C) can provide an example to further demonstrate a number of exemplary operations that can be performed in selection of a "best" (or representative or target) data type for a particular data set, namely, data set D 208 (also shown in FIG. 2).

As an example, the set of selection parameters 206A, provides there (3) parameters, or elements, or components: (i) "Minimum Coverage=none", "Maximum Space="none," and "Order Keys=[<f (s1) . . . ]". The first two (2) components can provide a threshold value that can be used to effectively disqualify any one of the nine (9) data types (represented in the statistics S 204) with a Minimum Coverage (or frequency) $S_1^{th}$ at is less than the expressed threshold. In this example, the Minimum Coverage Threshold is not set to be limiting (it is set to zero), so none of the nine (9) candidate data types can be disqualified. Similarly, applying the second component of "Maximum Space," the threshold is not set to be limiting (it is set a zero value), so none of the nine (9) candidate data types can be disqualified. As a result, all of the nine (9) candidate data types still remain as a viable candidate data type. Therefore, the third component set of selection parameters 210A, namely, the "Order Keys=[<f (s1) . . . ]" can be used in an effort to select one of the nine (9) candidate data types as the "best" or representative data type. In the set of selection parameters 206A, the "Order Keys=[<f (s1) . . . ]" is expressed with there (3) order keys (f($s_1$), f($s_2$), and f(c)) expressed either in a Descending order (DESC in f($s_1$)) or an Ascending Order (ASC in f($s_2$) and f(c)). In evaluating the "Order Keys=[<f (s1) . . . ]" three (3) order key values can be determined for each one the remaining nine (9) candidate data type by the MPE 200 as follows:

For the First Candidate Data Type (i.e., SMALLINT)

As shown in FIG. 2B, the first order key value is the output of the function of "f(s1)=s1." The output is the same as the input. So, the first order key value is 0. The second order key value is the output of the function of f(s3)=s3. The second order key value is 2. The third order key value is the output of the function of f(c)=pos (c). The input of this function is a candidate data type (i.e., SMALLINT at this moment). The output is the position of SMALLINT in the candidate data type list, which is 1. The result can be expressed as "(0, 2, 1)" as also shown in FIG. 2B.

For the $2^{nd}$ Candidate Data Type (i.e., INT)

The first order key value is 90. The second order key value is 4. The third order key value is 2.

For the $3^{rd}$ Candidate Type (i.e., BIGINT)

The first order key value is 95. The second order key value is 8. The third order key value is 3.

For the Remaining Candidate Types ($4^{th}$ to $9^{th}$)

For the $4^{th}$, the three order key values are 90, 4, 4. For the $5^{th}$, the three order key values are 97, 30, 5. For the $6^{th}$, the three order key values are 0, 4, 6. For the $7^{th}$, the three order key values are 0, 4, 7. For the $8^{th}$, the three order key values are 100, 42, 8. For the $9^{th}$, the three order key values are 100, 6.4, 9. FIG. 2C summarizes the resulting nine (9) set of order keys values for the candidate data types in accordance with one exemplary embodiment.

Thereafter, the MPE 200 can proceed to order the determined set of values (shown in FIG. 2C) using the ordering keys, where the $1^{st}$ order key is in a descending order and the other two (2) are in an ascending order. FIG. 2D depicts the resulting ordering that can be obtained by the MPE 200 in accordance with one embodiment. Referring to FIG. 2D, "VARCHAR" is sorted as the first item in the list of nine (9) remaining candidates. It should be noted that a tie based on the first values (i.e., 100) can be broken using the second key associated with the second numbers (i.e., 6.4 and 42) where the second key is used in ascending order to sort the value of 6.4 before the value of 42, resulting in "VARCHAR" is sorted as the first item in the list of nine (9) remaining candidates, ahead of "Char" and can be identified as the best data type 220a.

As another (a second) example, the set of selection parameters 206B, provides there (3) parameters, or elements, or components: (i) "Minimum Coverage=97", "Maximum Space="none," and "Order Keys=[<f (c) . . . ]. In this example, the MPE 200 can again determine whether any of the nine (9) candidate data types (C) 203 can be eliminated. More specifically, the MPE 200 can eliminate (or not select as a target data type) any data type in the data set (D) 208 does not have the threshold coverage as provided by the first statistical parameter ($S_1$) in the Statistics 204. In this example, the minimum coverage threshold is set to 97. So, six (6) out of the nine (9) candidate data types can be eliminated. In other words, only three (3) candidate data types can initially be qualified and selected as target or (potential) target data types (DECIMAL, CHAR, VAR-CHAR). MPE 200 can then proceed to use a second threshold provided for "Maximum Space" to determine whether any one of the three (3) remaining candidates data types can be eliminated, but in this example, the maximum space threshold for is not set to a limiting value, so none of the remaining three (3) candidate data types can be disqualified. FIG. 2E depicts the remaining candidate data type with their corresponding key values in accordance with one embodiment.

Therefore, MPE 200 can proceed to use the Order Keys provided in the set of selection parameters 210B as a third ($3^{rd}$) section value parameter in order to select one of the remaining three (3) candidate data types as the best or representative candidate in a similar manner as discussed above.

Specifically, when the order key: "f(c)=pos(c)," for 1st data type (i.e., DECIMAL), the order key value is 5. For the 2nd (i.e., CHAR), the order key value is 8, and for the 3rd (i.e., VARCHAR), the order key value is 9. FIG. 2F depicts the resulting sorted values in accordance with one embodiment. Referring now to FIG. 2F, sorting the 3 candidate data types based on the one order key value in an ascending order, the outcome is the following: (i) "DECIMAL" (its order key value is 5), (ii) "CHAR" (its order key value is 8 greater than 5), and (iii) "VARCHAR" (its order key value is 9 greater than 8), resulting in the selection of the "DECIMAL" by the MPE 200 as the best data type 220b, as "DECIMAL" is the first item in the list effectively sorted by the MPE 200, as described above.

As yet another (third) example, the set of selection parameters 206C, provides there (3) parameters, or elements, or components: (i) "Minimum Coverage=90", "Maximum Space="16," and "Order Keys=[<f ($s_3$) . . . ]. In this example, the MPE 200 can effectively disqualify any data types whose minimum coverage is less than the expressed value, namely a threshold value of ninety (90). As a result, only "six" candidate data types can be qualified by the MPE 200: "INT", "BIGINT", "FLOAT", "DECIMAL", "CHAR", and "VARCHAR." The MPE 200 can then disqualify any data types whose maximum space is greater than the threshold. Among the "six" remaining data types, only two (2), namely, "DECIMAL" and "CHAR" can be disqualified because their spaces (i.e., 30 and 42 respectively) are greater than 16. As a result, four (4) candidate data types would still remain, as depicted in FIG. 2G in accordance with one embodiment. This would result in pairs of keys (depicted in FIG. 2G) as follows: (i) For the 1st (i.e., INT), two order key values are 4 and 2, (ii) For the 2nd (i.e., BIGINT), two order key values are 8 and 3, (iii) For the 3rd (i.e., FLOAT), two order key values are 4 and 4, (iv) For the 4th (i.e., VARCHAR), two order key values are 6.4 and 9.

Thereafter, the MPE 200 can use the two (2) order keys (f($s_3$)=$s_3$ and f(c)=pos(c)) as expressed in the "Order Keys" expression of selection parameters 210C. In other words, MPE 200 can then sort the 4 sets of pair key values (shown in FIG. 2G) to obtain the following result (depicted in FIG. 2H) in accordance with one embodiment. Referring to FIG. 2H, a sorted list can be determined by the MPE 200 as follows: (i) "INT (its order key values are 4 and 2) (ii) "FLOAT (its order key values are 4 and 4), (iii) VARCHAR (its order key values are 6.4 and 9) and (iv) BIGINT (its order key values are 8 and 3). Consequently, the MPE 200 can select "INT" as the best (or representative) data type for the data set (D) 208.

Optimization of Multi-Parameter Data Type Framework and Systems

Generally, collection of statistics (statistics collection) can be one of the most expensive operations in selection of appropriate data types. The complexity of statistics collection can be proportional to the sizes of D and C. Accordingly, Optimization as a measure to address challenges encountered in collection of statistics are further discussed in accordance with one or more aspects. These aspects can be used individually or combined.

Sampling Values in D

In accordance with one aspect, a subset of the values in D can be excluded from collection in the statistics collection process. In other words, only a limited number (or subset) of values can, for example, randomly be chosen and used for statistics collection. For example, for controlling a sample size, three (3) parameters of: (i) Minimum Sample Size, (ii) Maximum Sample Size, and (iii) Sample Size with Regard to the Total number of values in D can be used, in accordance with one embodiment. It should be noted that the total number of values in a data set need not be necessarily be known for the purposes of sampling a data set before the statistics collection. As an example, for each value, a random number between 0 and 1 can be populated. If the random number is less than or equals to the sample percentage value (or percentage), then statistics are collected on the value. Sampling can reduce the burden of the statistics collection as the sample size gets smaller, but at the same time, it can also increase the risk that the final or "best" data type selected as a representative data type may not cover data values in a data set that were not effectively sampled.

Pruning Out Data Types in C

In accordance with another aspect, a candidate date type can be effectively excluded from the Candidate Data Types C. For example, during the statistics collection time, if it is determined that a candidate data type cannot possibly reach, for example, a Minimum Coverage threshold, the candidate data type can be effectively excluded from the Candidate Data Types. In this example, assuming a Minimum Coverage threshold of 100%, for D and C as depicted in FIG. 2, after testing the first value (i.e., 3001) in D for DATE, we immediately know that "DATE" data types cannot cover the first value and the coverage of DATE data types must be less than 100%. So, both of the "DATE" types ("mm-dd-yy" and "yyyy-mm-dd) can be effectively eliminated from C and consequently eliminated from consideration as a candidate data type in section of the best (or representative) data type.

Parallel Computation

As noted above, collection of statistics (statistics collection) can be the most expensive operations in selection of appropriate data types. The complexity of statistics collection can be proportional to the sizes of a data set (D) and a set of data types(C). Accordingly, Parallel Computation techniques are discussed below as a measure to address challenges encountered in collection of statistics in accordance with additional aspects. It should be noted that these aspects can be used individually or combined.

In accordance with one aspect, the operation of collecting statistics can be parallelized by multiple processors, and the statistics from individual processors can be consolidated by one processor for the final data type decision. More specifically, two ways of partitioning of the workload for parallelization will be discussed in accordance with one or more aspects that can be used individuality or together.

Partitioning Data Values in D

In accordance with one aspect, a given data set (D) can be effectively split into multiple partitions, for example, based on the number of processors they are available and/or allocated (e.g., based on as many as the number of processors available or allocated) such that each processor collects statistics on the values of its own assigned partition. This approach may require a data set (D) to be partitioned physically. In a shared-nothing parallel architecture, this could cause a preprocessing overhead (e.g., reading the values and writing those values in a partitioned form). In consideration of multiple data sets (like D1, D2, D3, and so on), if the data sets can be accessed/processed independently, this approach can be applied to individual data sets, in turn, so that there may not be a need to hold and/or process the information simultaneously for all the data sets and the underlining system-wide peak resource usage can be decreased.

Partitioning Candidate Data Types in C

In accordance with this aspect, candidate data types can be assigned to processors, so that each processor can focus on collecting statistics with regard to its assigned candidate data type. For example, given two (2) processors, the first processor can be focused on collecting the frequency of an "INT" data type, and the other processor can be focused on collecting the frequency of a "DATE" data type.

Figure 3:
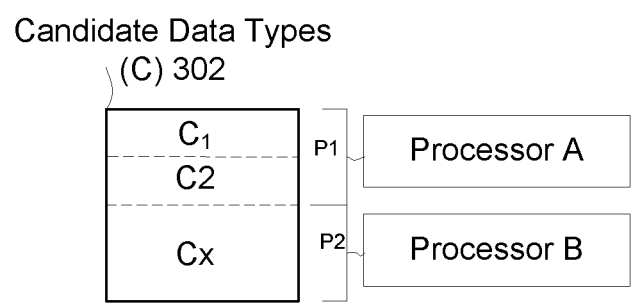
FIG. 3 depicts partitioning of a candidate data types C into two (2) partitions for processing by two (2) processors for collection of statistics for a data set D, in accordance with one embodiment.

To further elaborate, FIG. 3 depicts partitioning of a candidate data types C into two (2) partitions for processing by two (2) processors for collection of statistics for a data set D, in accordance with one embodiment. Referring to FIG. 3, a set of candidate data types (C) 302 is effectively partitioned into two (2) subsets represented by two partitions (P1 and P2), where each subset candidate data types (C) 302 is assigned to a processor for processing of collection of statistics of a data set (D) (not shown) in a parallel manner. In the example, data types $C_1$ and $C_2$ are represented as the first partition (P1) and one or more data type (CX) in the candidate data types C is represented in a second first partition (P2), where the first and second partitions (P1 and P2) are respectively assigned to first and second processors (A and B). In more practical applications, each one of the data types in a set of candidate data types (C) can be assigned to one or more processors for multiprocessing in accordance with one or more embedment, as it will be readily appreciated by those skilled in the art.

It should be noted that this approach can require all processors to look up all the values in a data set (D). In a "shared-nothing parallel architecture," a data set (D) may have to be duplicated for all the participating processors. This approach can have the risk of causing a workload imbalance, especially when a pruning optimization technique is also used. However, this approach can be especially feasible when large number of data sets need to be analyzed simultaneously. For example, when large numbers of "CSV" files whose fields correspond to different data sets are analyzed, values from different data sets need to be read before finishing the process of analyzing a data set. In such cases, this approach can reduce the peak-resource usage by not holding/processing the information of all the candidate data types simultaneously.

Data Type Reconciliation

As noted above, data stored in a database can change over time. Typically, data that is collected grows in size and/or data sets are joined together. As such, a more challenging problem is determination of the best data type when data changes. In other words, a more challenging problem is how to reconcile a best data type for a data set as the data set grows.

As such, it will be appreciated that an incremental reconciling approach can be used in accordance with one aspect. More particularly, initially, a best data type can be determined for the new data values of the data set, before reconciling the two (2) data types (i.e., best data type of the original data values and best data type of the new data values). This approach can avoid analyzing the previous data values again. To further elaborate, let "$D_o$" and "$D_n$" be the original set of data values and the new set of data values, respectively. So, a data set D can be expressed as ($D_o$ U $D_n$). Let "$t_o$" and "$t_n$" be the best (or representative) data types for "$D_o$" and "$D_n$," respectively. It should be noted in the following discussion "t" is used (instead of "r") to donate the best or the final candidate type. Using this notation, the following strategies can be used to determine a data type for D:

(i) if the domain of "$t_o$" (Best Data Type of the Initial Data) or the domain of "$t_n$" (Best Data Type of New Data) is a superset of the domain of the other, then "t" for the data set D is reconciled to the one that have the superset domain. For example, if "$t_o$" is "SMALLINT" data type and '$t_n$" is an "INT," then "INT" can be chosen as the best data type for the data set D (or the data set that includes the initial and new data sets). Particularly, for a reconciliation between two of the same or different character type classes (e.g., CHAR vs CHAR, VARCHAR vs. VARCHAR, and CHAR vs. VARCHAR), a "data type class" and "MaxLen" can be reconciled to a chosen data type that would require less space and would cover both $D_o$ and $D_n$. For example, supposing |$D_o$| and |$D_n$| are the same. If "to' is CHAR (10) and $t_n$ is "CHAR (20)" then "VARCHAR (20)" is selected instead of "CHAR (20)". As other example, if "$t_o$" is "VARCHAR (10)" and "$t_n$" is "CHAR (20)" then "VARCHAR (20)" can be chosen. As yet another example, if $t_o$ is "CHAR (10)" and "$t_n$" is "VARCHAR (20)" then VARCHAR (20) can be chosen. As still another example, if $t_o$ is "CHAR (10)" and $t_n$ is "CHAR (11)" then "CHAR (11)" can be chosen because "CHAR (11)" would require less space than "VARCHAR (11)" in this example.

(ii) If the domain of data types "$t_1$" and "$t_2$" are mutually exclusive (e.g., INT and TIME) or only partially overlapped (e.g., FLOAT and DECIMAL), the coverages of "$t_o$" and "$t_n$" can be compared with regard to D. The coverage of "$t_o$" for D can be computed accurately because the statistics for "$t_o$" can be collected on new data values while the statistics for "$t_n$" are being collected. On the other hand, it is may be possible and/or feasible to compute the actual coverage of "$t_n$" for D without testing "$t_n$" for "$D_o$," so the coverage can simply be computed as "((the coverage of $t_n$ for $D_n$)*|$D_n$|)/|D|". If one of the coverages is greater than the other, the one with the better coverage can be selected as long as the better coverage would be greater than the minimum coverage threshold. If none of them satisfies the minimum coverage threshold, a general data type such as a string (variable-length and fixed-length) can be chosen as the best data type for D. For example, "$t_o$" is "CHAR (10)" with 900 values in "$D_o$", and "$t_n$" is "DECIMAL (12,3)" with 100 values in "$D_n$." If the coverage threshold is 0.8, "CHAR (10)" can be selected since it would have a coverage 0.9 which is better than "$t_n$'s", and it meets the minimum coverage. If the coverage threshold is 1.0, neither one ("CHAR (10)" and "DECIMAL (12,3)") can be selected. As a result, "CHAR (12)" can be selected as a general data type.

Figure 4:
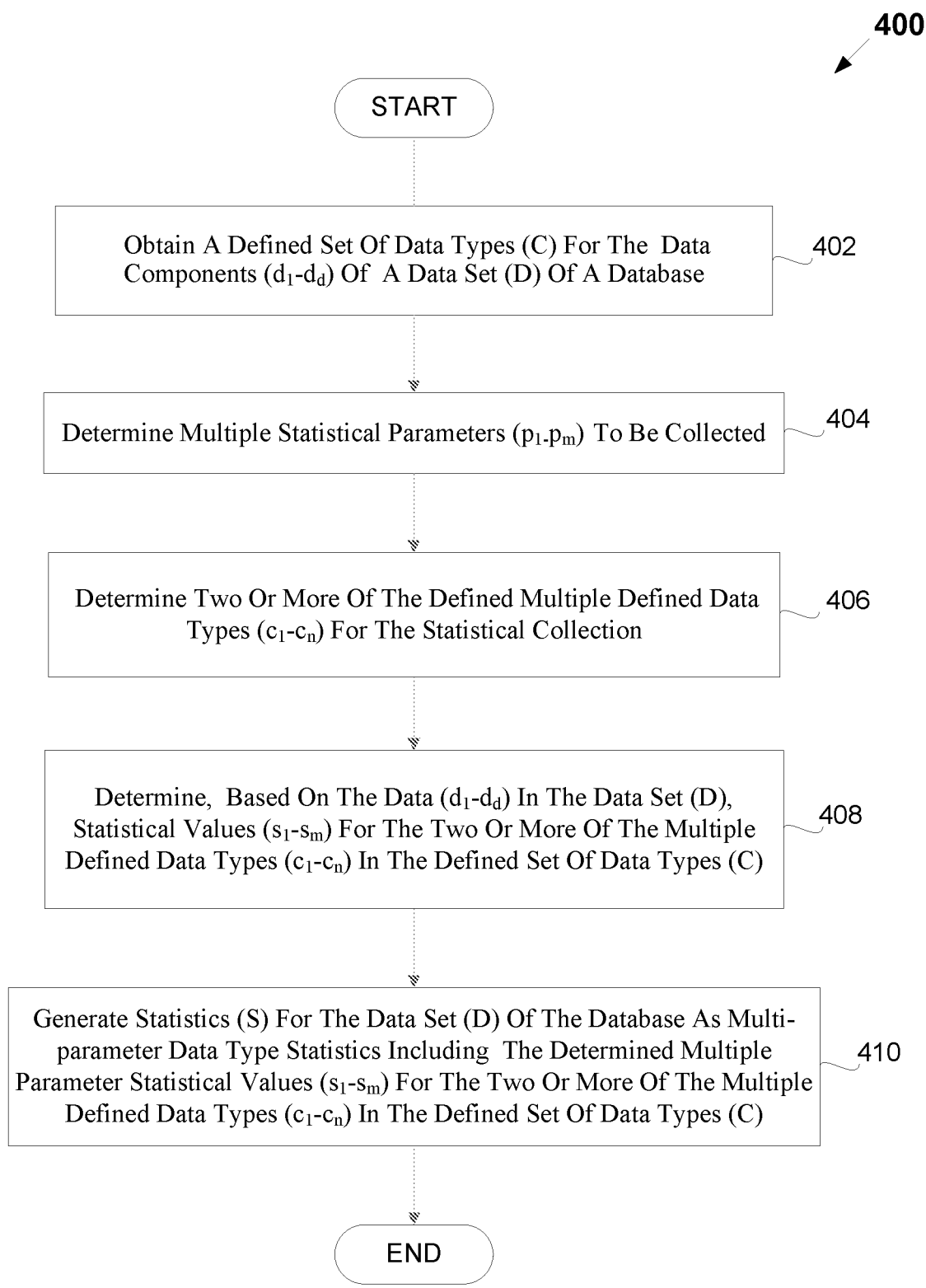
FIG. 4 depicts a method for generating a set of statistics (S) for a data set (D) of a database in accordance with one embodiment.

To elaborate even further, FIG. 4 depicts a method 400 for generating a set of statistics (S) for a data set (D) of a database in accordance with one embodiment. It should be noted that the database can be configured to be accessed by a database system that includes one or more processors configured to access and to process data stored in the database, including the data set (D). It should also be noted that data set (D) can include a plurality of data ($d_1$-$d_d$). Method 400 can, for example, be performed by the multi-parameter data type statistics generation system (MPSG) 102A in the multiparameter data type framework (MPF) 102 (shown in FIG. 1). As such, those skilled in the art will readily appreciate that method 400 can, for example, be performed by a computing system (e.g., a database management system) that utilizes one or more processors configured to perform the method 400 and/or configured to obtain computer readable executable code that may be stored in a medium (a non-transitory storage medium) form to perform one or more of the operations that can be performed by method 400. A number of operations of method 400 are described below in greater detail.

Referring to FIG. 4, initially, a defined set of data types (C) is obtained (402) for collection of multi-parameter statistics from a data set (D) of the database. It should be noted that data set (D) can include multiple data components ($d_1$-$d_d$), such that the defined set of data types (C) is defined for collection of multi-parameter statistics pertaining to the multiple data components ($d_1$-$d_d$) of the data set (D) of the database. In other words, the set of data types (C) can be defined for collection of multi-parameter statistics with respect to the data components ($d_1$-$d_d$) of the data set (D) of the database. As noted above, the defined set of data types (C) can, for example, be part of a multi-parameter model (modeling system) in accordance with one aspect. In other words, the defined set of data types (C) can include a set of (defined) data types defined or modeled so that the data types ($c_1$-$c_n$) in the set of data types (C) can effectively encompass the expected data types for each one (or all) of the data components ($d_1$-$d_d$) of the data set (D) of the database. As such, an individual data component ($d_1$-$d_d$) of the data set (D) can be assigned to at least one of the multiple defined data types ($c_1$-$c_n$) as the data components data type. Typically, virtually each one the data components ($d_1$-$d_d$) of the data set (D) can be expected to be assigned to at least one of the defined data types ($c_1$-$c_n$). However, it is also possible to extend or expand the set of data types (C) statically or dynamically when a new and/or unexpected data type may be encountered. It should be noted that a data types (c) of the set of data types (C) can itself be defined with respect with multiple data parameters, for example, as parameters associated with (i) data type class (ii) data type format, and (iii) data type maximum six, in accordance with exemplary embodiment, as noted above (also shown in FIG. 2).

Referring to FIG. 4, in addition to obtaining (402) of the defined set of data types (C), multiple statistical parameters ($p_1$-$p_m$) that are to be collected are determined (404), and two or more of the defined multiple defined data types ($c_1$-$c_n$) in the defined set of data types (C) are also determined (406). In other words, it can be determined (406) that it is not necessary and/or desirable to collect statistics for all of the data types ($c_1$-$c_n$) in the defined set of data types (C) for the data set (D). Typically, the set of data types (C) can be defined more broadly to include multiple sets of data, including a particular data set (D). As such, it may not be necessary and/or desirable to collect statistics for all of the data types ($c_1$-$c_n$) given a particular data set D and/or application. Of course, it is possible to define data types (C) more narrowly and/or it may also be desirable to collect statistics for all of the data types ($c_1$-$c_n$) especially when the set represents a set of candidate data type. Similarly, statistical parameters ($p_1$-$p_m$) can be determined (404), for example, selected from a defined set of statistical parameters this defined either broadly, for example, for a class data types, a database, or specifically for a particular one or more data sets.

In any case, based on the multiple data components ($d_1$-$d_d$) in the data set (D), multiple parameter statistical values ($s_1$-$s_m$) for two or more of the multiple defined data types ($c_1$-$c_n$) in the defined set of data types (C) can be determined (408). Typically, determining (408) of the multiple parameter statistical values ($s_1$-$s_m$) can be performed by processing the data components ($d_1$-$d_d$) in the data set (D) in connection with the determined (404) multiple statistical parameters ($p_1$-$p_m$). In other words, by determining (e.g., calculating) a statistical value ($s_i$) (e.g., average size, or average length) of a particular data type $c_i$ (e.g., "INIT") of interest in a data set (D) during the process of multi-parameter statistical collection. In other words, the determined (408) multiple parameter statistical values ($s_1$-$s_m$) are the determined values of the determined (404) multiple statistical parameters ($p_1$-$p_m$), thereby statistics can be effectively collected by determining (408) of statistical values ($s_1$-$s_m$) as values collected with respect to the determined (404) statistical parameters ($p_1$-$p_m$) for the determined (406) two or more of the data types ($c_1$-$c_n$) obtained (402) as a defined set of data types. In other words, statistics (S) can be generated (410) for the data set (D) of the database as multi-parameter data type statistics, such that the multi-parameter data type statistics includes multiple parameter statistical values ($s_1$-$s_m$) for the two or more of the multiple defined data types ($c_1$-$c_n$) in the defined set of data types (C). Method 400 can end after statistics (S) is generated (410).

It should be noted that method 400 may optionally include additional operations that are not depicted in FIG. 4 for the sake of simplicity. For example, one or more selection value parameters ($v_1$-$v_v$) for the data set (D) can be obtained, such that each one of the selection value parameters ($v_1$-$v_v$) is defined with respect to at least one of the multiple-parameter statistical values ($s_1$-$s_m$). In addition, Method 400 can determine not to collect statistics, or stop the collection of statistics with respect to at least one of the multiple defined data types ($c_1$-$c_n$) for example, based the obtained one or more selection value parameters ($v_1$-$v_n$). Of course, the defined set of multiple statistical parameters ($p_1$-$p_p$) may also be obtained at least partially, for example, as input. Furthermore, statistical parameters ($p_1$-$p_p$) can be selected from am obtained (defined) set of statistical parameters for the collection of statistics.

As noted above, statistics collection can be performed in parallel in accordance with one aspect. Although not shown in FIG. 4, method 400 can also include parallel processing of the one or more processes of the collection of statistics (statistical collection), for example, in a database system that includes two or more processors configured to access, and to process, the data stored in the database, in parallel. For example, collection of statistic with respect to a first one of the multiple defined data types ($c_1$-$c_n$) can be assigned to at least a first one the multiple processing units, and collection of statistic with respect to a second one (different than the first one) of the defined data types ($c_1$-$c_n$) to at least a second one (different than the first one) of the multiple processing units. Alternatively, or additionally, a data set (D) can be effectively partitioned into multiple segments or parts and each assigned to a different processor of a multi-processing (or parallel) computing system.

Figure 5:
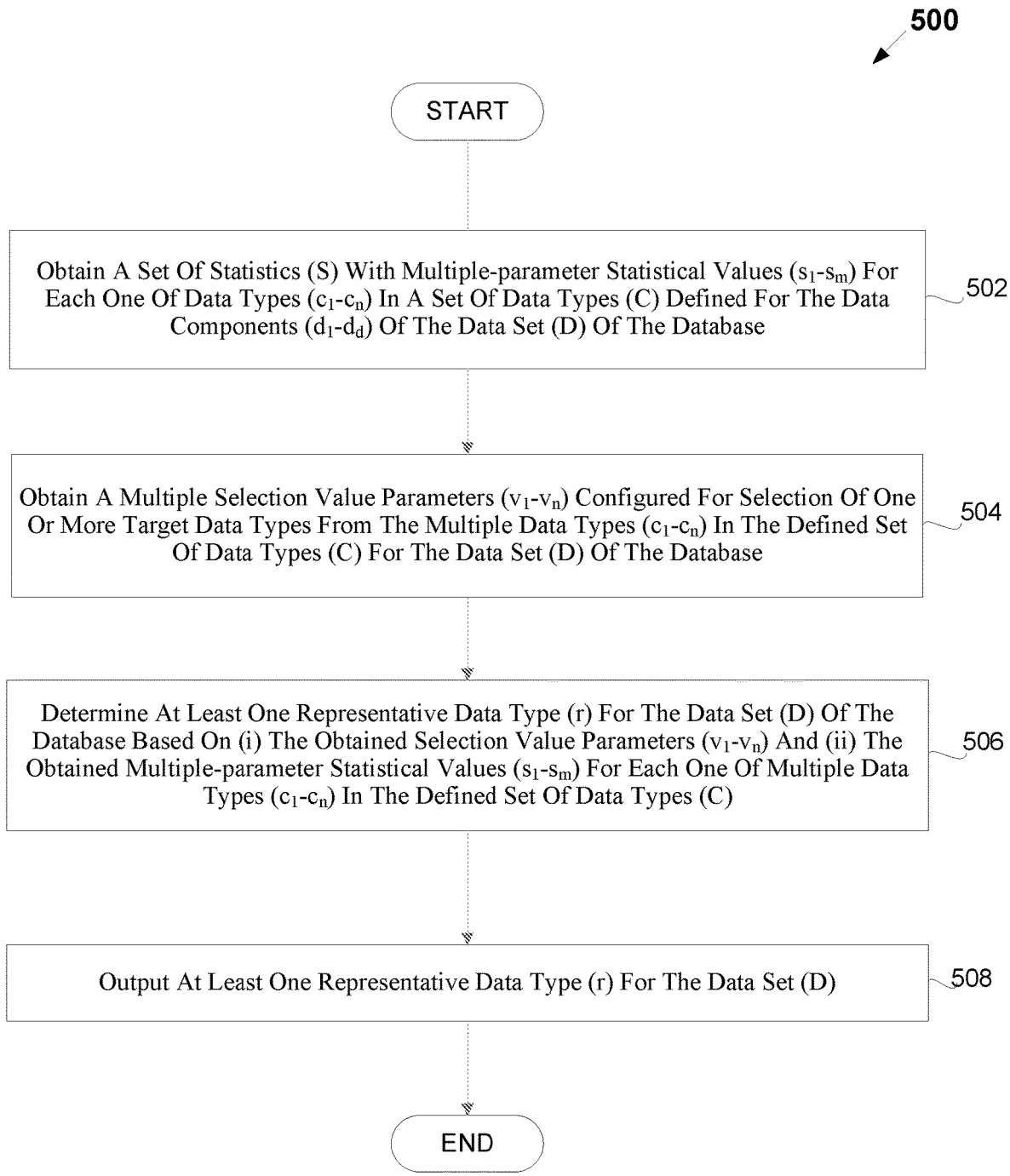
FIG. 5 depicts a method for determining a representative data type for a data set (D) of a database in accordance with one embodiment.

To elaborate still further, FIG. 5 depicts a method 500 for determining a representative data type for a data set (D) of a database in accordance with one embodiment. It should be noted that the database can be configured to be accessed by a database system that includes one or more processors configured to access, and to process, data stored in the database, including the data set (D). It should also be noted that data set (D) can include a plurality of data ($d_1$-$d_d$). Method 500 can, for example, be performed by the multi-parameter data type evaluation system (MPE) 102B in the multi-parameter data type framework (MPF) 102 (shown in FIG. 1). As such, those skilled in the art will readily appreciate that method 500 can, for example, be performed by a computing system (e.g., a database management system) that utilizes one or more processors configured to perform the method 500 and/or configured to obtain computer readable executable code that may be stored, for example, a non-transitory computer medium to perform one or more of the operations of method 400. Operations of method 500 are describe below in greater detail.

Referring to FIG. 5, initially, a set of statistics (S) is obtained (502). It should be noted that that the obtained (502) set of statistics (S) can include multiple-parameter statistical values ($s_1$-$s_m$) for each one of the data types ($c_1$-$c_n$) defined (e.g., provided, modeled, or formulated statically, or dynamically) in a set of data types (C) that are defined (or can be defined) for the data components ($d_1$-$d_d$) of the data set (D) of the database, such that each one of the statistical values ($s_1$-$s_m$) is associated with (e.g., assigned to) at least one of the data types ($c_1$-$c_n$) in the defined set of data types (C). It may be desirable, for at least some applications, to assign the same set of parameter statistical values ($s_1$-$s_m$) to each one of the data types ($c_1$-$c_n$) defined, but of course, it is not necessary to do so.

In addition to obtaining (502) the set of statistics (S), multiple selection value parameters are also obtained (504). It should be noted that the multiple selection value parameters ($v_1$-$v_n$) can be configured, for example, for selection of one or more target data types from the multiple data types ($c_1$-$c_n$) in the defined set of data types (C) for the data set (D) of the database, such that each one of the selection value parameters ($v_1$-$v_n$) is defined with respect to at least one of the multiple-parameter statistical values ($s_1$-$s_m$) in the obtained (502) set of set of statistics (S).

Thereafter, at least one representative data type (r) for the data set (D) of the database is determined (506) based on (i) on the obtained (504) selection value parameters ($v_1$-$v_n$) and (ii) the obtained (502) multiple-parameter statistical values ($s_1$-$s_m$) for each one of multiple data types ($c_1$-$c_n$) in the defined set of data types (C). As a result, at least one representative data type for the data set (D) can be determined (506) based on multiple section parameters (i.e., selection value parameters ($v_1$-$v_n$)) and multiple statistical values (i.e., statistical values ($s_1$-$s_m$)) provided for the defined set of data types (C). Finally, the determined (506) at least one representative data type (r) for the data set (D) of the database can be outputted (508) before the method 500 ends. However, additional exemplary operation that can be performed by, or in connection with, the method 500 are further discussed below.

As noted above, that the defined data type in the set of data types (C) described with respect to method 500 (deposited in FIG. 5) can also include (or be defined or modeled to include) multiple parameters, for example, in accordance with a multiparameter model defined in accordance with the aspect. By way of example, data parameters provided for a data type (c) is the defined set of data types (C) can include: (i) a data type class, (ii) a data type format, and (iii) a data type maximum size. Referring back to FIG. 5, it should also be noted that the determined (506) at least one representative data type (r) can also include (or be defined or modeled to include) multiple parameters, for example, in accordance with a multiparameter model defined in accordance with the aspect. As such, the representative data type (r) can, for example, (i) a data type class, (ii) a data type format, and (iii) a data type maximum size.

It should be noted that the determined (506) representative data type (r) can, for example, include and/or be indicative of one or more of the following with respect to the data set (D): an appropriate data type for the data set (D), a best data type for data set (D), a representative data type appropriately representing the data set (D), a best data type for representation of the data set (D) in a relational database, and a best data type for storing the data set (D) in database, a best and/or, most appropriate, and/or more representative data type for data set (D), and a best and/or, most appropriate, and/or more representative data type for data set (D) given the set of data types (C).

Furthermore, referring to method 500 (shown FIG. 5), the determining (506) of the representative data type for the data set (D) of the database based on the obtained (504) selection value parameters ($v_1$-$v_n$) and the obtained (506) multiple-parameter statistical values ($s_1$-$s_m$) for each one of multiple data types ($c_1$-$c_n$) in the defined set of data types (C) can, for example: (ii) select, based on the obtained selection value parameters ($v_1$-$v_n$), one or more data types from the multiple data types ($c_1$-$c_n$) in the defined set of data types (C) for the data set (D) of the database, as one or more candidate data types (t), and (ii) select, from one or more candidate data types (ct), based on the obtained selection value parameters ($v_1$-$v_n$), the representative data type (r). In other words, one or more data types ($c_1$-$c_n$) in the defined set of data types (C) can be effectively eliminated for consideration of being the representative data type (r) where one or more other data types ($c_1$-$c_n$) in the defined set of data types (C) can effectively be considered as one or more candidate data types (t) in selecting one of the them as the representative data type (r).

In addition, the obtained (504) selection value parameters ($v_1$-$v_n$) can, for example, include: (i) one or more threshold values expressed in terms of one or more parameters associated with one or more of the multiple-parameter statistical values ($s_1$-$s_m$) and (ii) one or more ordering priorities expressed in terms of the one or more parameters associated with one or more of the multiple-parameter statistical values ($s_1$-$s_m$). The (i) one or more threshold values expressed and (ii) one or more ordering priorities can individually, or collectively be used to: (i) effectively select one or more one or more candidate data types (ct) from the data types ($c_1$-$c_n$) in the defined set of data types (C) for the data set (D) of the database and/or (ii) selecting, from multiple candidate data types (ct), one or more representative data type (r). Typically, at least in some applications, it is desirable to select only one data type (e.g., "best" data type) as the representative data type (r). As such, (i) one or more threshold values expressed and (ii) one or more ordering priorities can individually, or collectively be used to select one of the data types ($c_1$-$c_n$) in the defined set of data types (C) for a particular data set (e.g., the data set (D)).

By way of example, one or more threshold values expressed in terms of one or more parameters associated with one or more of the multiple-parameter statistical values ($s_1$-$s_m$) can be defined to include one or more of the following: a Maximum Coverage, and a Maximum Space, as it will also described above with accordance with one or more embodiment (see, for example, FIG. 2). In addition, one or more ordering priorities expressed in terms of the one or more parameters associated with one or more of the multiple-parameter statistical values ($s_1$-$s_m$) can be provided, for example to include one or more order keys (see, for example, "Order Keys" shown in FIG. 2).

Still further, it should be noted that determining (506) of the at least one representative data type (r) for the data set (D) of the database, based on the obtained selection value parameters ($v_1$-$v_n$) and the obtained multiple-parameter statistical values ($s_1$-$s_m$) for each one of multiple data types ($c_1$-$c_n$) in the defined set of data types (C), can, for example, apply a first one ($v_f$) of the obtained (504) multiple selection value parameters ($v_1$-$v_n$) to a first one ($s_g$) of the obtained (502) multiple-parameter statistical values ($s_1$-$s_m$) associated with at least one of the data types ($c_1$-$c_n$) in the set of data types (C) defined for the data set (D) of the database.

In addition, based on the applying of the first one ($v_f$) the obtained multiple selection value parameters ($v_1$-$v_n$), one of more of the multiple data types ($c_1$-$c_n$) in the set of data types (C) defined for the data set (D) of the database, can be selected and identified as one or more target data types (t) (or candidates for selection as a representative data type (r)). Thereafter, if it is desirable to select only one data type as the representative data type (r), it can be determined whether more than one (1) target data types (t) have been identified. Consequently, a second one (vs) of the multiple selection value parameters ($v_1$-$v_n$) to a second one (s q) of the multiple-parameter statistical values ($s_1$-$s_m$) associated with the two or more identified target data types ($t_1$-$t_t$) when it is determined that more than one (1) target data types (t) has been identified and if it is desirable to select only one data type as the representative data type (r), and so.

It should also be noted one or more ordering rules can also be applied, for example in order to determine an ordered list of the remaining target. These one or more rules can, for example, be applied to resolve ties between any target data types (t). Generally, the rule(s) can, be expressed in terms of one or more parameters corresponding to the obtained (502) set of statistics (S) and more particularly one or more multiple-parameter statistical values ($s_1$-$s_m$). As such, the rule(s) can be effectively used to determine (e.g., select) at least one representative data type (r) (e.g., at least one data type selected from the set of data types (C).

Although it is not shown in FIG. 5, it should also be noted that method 500 can also be provided to consolidate a determined representative data type with another representative data type representative in accordance with one embodiment. In doing so, for example. another (or a second) representative data type representative of a second data set can obtained and compared to the first determined representative data type of the first data set in order to determine a consolidated for representative data type as representative data type for both the first and second data sets as a consolidated data set, as also discussed above (Data Type Reconciliation).

The various aspects, features, embodiments or implementations described above can be used alone or in various combinations. For example, implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CDROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, tactile or near-tactile input.

Implementations of the subject matter described in this specification can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described is this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computer-implemented method of determining a representative data type for a data set (D) of a database configured to be accessed by a database system, wherein the database system includes one or more processors configured to access and to process data stored in the database, wherein that data stored in the database includes a data set (D), wherein data set (D) of the database includes a plurality of data ($d_1$-$d_d$), and wherein the computer-implemented method comprises:

obtaining a set of statistics(S) that includes multiple-parameter statistical values ($s_1$-$s_m$) for each one of multiple data types ($c_1$-$c_n$) in a set of data types (C) defined for the plurality of data components ($d_1$-$d_d$) of the data set (D) of the database, such that each one the multiple parameter statistical values ($s_1$-$s_m$) is associated with at least one of the multiple data types ($c_1$-$c_n$) in the defined set of data types (C);

obtaining multiple selection value parameters ($v_1$-$v_v$) configured for selection of one or more target data types from the multiple data types ($c_1$-$c_n$) in the defined set of data types (C) for the data set (D) of the database, wherein each one of the selection value parameters ($v_1$-$v_v$) is defined with respect to at least one of the multiple-parameter statistical values ($s_1$-$s_m$) in the obtained set of set of statistics(S);

determining, based on the obtained selection value parameters ($v_1$-$v_v$) and the obtained multiple-parameter statistical values ($s_1$-$s_m$) for each one of multiple data types ($c_1$-$c_n$) in the defined set of data types (C), at least one representative data type (r) for the data set (D) of the database, thereby determining the representative data type for the data set (D) based on multiple section parameters and multiple statistical values provided for the defined set of data types (C); and outputting the determined representative data type as the representative data type (r) for the data set (D) of the database.

2. The computer-implemented method of claim 1, wherein the representative data type (r) includes and/or is indicative of one or more of the following with respect to the data set (D):

an appropriate data type for the data set (D), a best data type for data set (D), a representative data type appropriately representing the data set (D), a best data type for representation of the data set (D) in a relational database, and a best data type for storing the data set (D) in database, a best and/or, most appropriate, and/or more representative data type for data set (D), and a best and/or, most appropriate, and/or more representative data type for data set (D) given the set of data types (C).

3. The computer-implemented method of claim 1, wherein the determining of the representative data type for the data set (D) of the database based on the obtained selection value parameters ($v_1$-$v_v$) and the obtained multiple-parameter statistical values ($s_1$-$s_m$) for each one of multiple data types ($c_1$-$c_n$) in the defined set of data types (C) further comprises:
  selecting, based on the obtained selection value parameters ($v_1$-$v_n$), one or more data types from the multiple data types ($c_1$-$c_n$) in the defined set of data types (C) for the data set (D) of the database, as one or more candidate data types (t); and
  selecting, from one or more candidate data types (ct), based on the obtained selection value parameters ($v_1$-$v_n$), the representative data type (r).

4. The computer-implemented method of claim 3, wherein the obtained selection value parameters ($v_1$-$v_v$) include:
  (i) one or more threshold values expressed in terms of one or more parameters associated with one or more of the multiple-parameter statistical values ($s_1$-$s_m$); and
  (ii) one or more ordering priorities expressed in terms of the one or more parameters associated with one or more of the multiple-parameter statistical values ($s_1$-$s_m$).

5. The computer-implemented method of claim 4, wherein the one or more threshold values expressed in terms of one or more parameters associated with one or more of the multiple-parameter statistical values ($s_1$-$s_m$) include one or more of the following:
  a Maximum Coverage, and a Maximum Space, and wherein one or more ordering priorities expressed in terms of the one or more parameters associated with one or more of the multiple-parameter statistical values ($s_1$-$s_m$) include one or more order keys.

6. The computer-implemented method of claim 1, wherein the determining of the at least one representative data type (r) for the data set (D) of the database, based on the obtained selection value parameters ($v_1$-$v_f$) and the obtained multiple-parameter statistical values ($s_1$-$s_m$) for each one of multiple data types ($c_1$-$c_n$) in the defined set of data types (C), further comprises:
  applying a first one ($v_f$) of the obtained multiple selection value parameters ($v_1$-$v_f$) to a first one ($s_g$) of the obtained multiple-parameter statistical values ($s_1$-$s_m$) that is associated with at least one of the multiple data types ($c_1$-$c_n$) in the set of data types (C) defined for the data set (D) of the database;
  selecting, based on the applying of the first one ($v_f$) the obtained multiple selection value parameters ($v_1$-$v_n$), one of more of the multiple data types ($c_1$-$c_n$) in the set of data types (C) defined for the data set (D) of the database; and
  identifying the selected one of more of the multiple data types ($c_1$-$c_n$) as one or more target data types (t).

7. The computer-implemented method of claim 6, wherein the selecting of the representative data type for the data set (D) of the database, from the multiple data types ($c_1$-$c_n$) in the defined set of data types (C), based on the obtained selection value parameters ($v_1$-$v_f$) further comprises:
  determining whether more than one target data types ($t_1$-$t_t$) has been identified; and
  applying a second one (vs) of the multiple selection value parameters ($v_1$-$v_f$) to a second one (sq) of the multiple-parameter statistical values ($s_1$-$s_m$) associated with the two or more identified target data types ($t_1$-$t_t$) when the determining determines that more than one target data types (t) has been identified.

8. The computer-implemented method of claim 7, wherein the determining of the representative data type for the data set (D) of a database, further comprises:
  determining whether more than one target data types ($t_1$-$t_t$) has been identified after the applying of the second one (vs) of the multiple selection value parameters;
  applying one or more ordering rules to determine an ordered list of the remaining one of the multiple identified target data types ($t_1$-$t_t$) as the representative data type when the determining determines that more than one target data types ($t_1$-$t_t$) has been identified after the applying of the second one (vs) of the multiple selection value parameters.

9. The computer-implemented method of claim 8, wherein the determining of the representative data type for the data set (D) of a database, further comprises:
  applying one or more ordering rules to determine an ordered list of the remaining one of the multiple identified target data types ($t_1$-$t_t$); and
  selecting the at least one representative type data (r) based on the ordered list.

10. The computer-implemented method of claim 1, wherein one or more of the multiple data types ($c_1$-$c_n$) in the defined set of data types (C) and are defined to also include multiple data parameters, and wherein the at least one representative data type (r) defined to also include multiple data parameters.

11. The computer-implemented method of claim 2, wherein the set of data types (C) and the multiple-parameter statistical values ($s_1$-$s_m$) are defined using a data type of model, and wherein the data type model includes multiple data parameters defined for at least one of the defined data types in the set of data types (C).

12. The computer-implemented method of claim 11, wherein one or more of the defined data parameters include: (i) a data type class, (ii) a data type format, and (iii) a data type maximum size.

13. The computer-implemented method of claim 1, wherein the computer-implemented method further comprises: consolidating the determined representative data type with another representative data type representative of another data set by at least: obtaining the other representative data type; and comparing it with the determined representative data type; and determining a consolidated for representative data type as representative data type for both the data set and the other data set.

14. A computer-implemented method of generating a set of statistics(S) for a data set (D) of a database configured to be accessed by a database system, wherein the database system includes one or more processors configured to access and to process data stored in the database, wherein that data stored in the database includes a data set (D), wherein data set (D) of the database includes a plurality of data ($d_1$-$d_d$), and wherein the computer-implemented method comprises:

obtaining a defined set of data types (C) defined for collection of multi-parameter statistics from the data set (D) of the database, wherein the data set (D) of the database includes a plurality of data components ($d_1$-$d_d$), wherein the defined set of data types (C) includes multiple defined data types ($c_1$-$c_n$);

determining multiple statistical parameters ($p_1$-$p_m$) for the collection of the multi-parameter statistics from the data set (D) of the database, determining two or more of the defined multiple defined data types ($c_1$-$c_n$) in the defined set of data types (C) for the collection of the multi-parameter statistics from the data set (D) of the database;

determining, based on the plurality of data components ($d_1$-$d_d$) in the data set (D), multiple parameter statistical values ($s_1$-$s_m$) for the two or more of the multiple defined data types ($c_1$-$c_n$) in the defined set of data types (C), wherein the determined multiple parameter statistical values ($s_1$-$s_m$) are the determined values of the determined multiple statistical parameters ($p_1$-$p_m$), thereby collecting statistics with respect to the determined statistical parameters ($p_1$-$p_m$) for the two or more of the data types ($c_1$-$c_n$) in the obtained defined set of data types (C); and generating the statistics(S) for the data set (D) of the database as multi-parameter data type statistics, wherein the multi-parameter data type statistics includes the determined multiple parameter statistical values ($s_1$-$s_m$) for the two or more of the multiple defined data types ($c_1$-$c_n$) in the defined set of data types (C).

15. The computer-implemented method of claim 14, wherein the determining of multiple statistical parameters ($p_1$-$p_m$) to be collected for the two or more of the defined multiple defined data types ($c_1$-$c_n$) comprises: determining that the statistical parameters ($p_1$-$p_m$) are to be collected for each one of the defined multiple defined data types ($c_1$-$c_n$).

16. The computer-implemented method of claim 15, wherein the computer-implemented method further comprises:

obtaining one or more selection value parameters ($v_1$-$v_n$) for the data set (D), wherein each one of the selection value parameters ($v_1$-$v_n$) is defined with respect to at least one of the multiple-parameter statistical values ($s_1$-$s_m$); and determining not to collect statistics or stopping the collection of statistics with respect to at least one of the multiple defined data types ($c_1$-$c_n$) based the obtained one or more selection value parameters ($v_1$-$v_n$).

17. The computer-implemented method of claim 14, wherein the computer-implemented method further comprises:

obtaining the defined set of multiple statistical parameters ($p_1$-$p_p$) and;

selecting from the obtained defined set of multiple statistical parameters the multiple statistical parameters ($p_1$-$p_p$) for the collection of statistics.

18. The computer-implemented method of claim 14, wherein the database system includes two or more processors configured to access and to process the data stored in the database in parallel; and wherein the determining of the multiple parameter statistical values ($s_1$-$s_m$) for the two or more of the multiple defined data types ($c_1$-$c_n$) in the defined set of data types (C) further comprises: parallel processing of the one or more processes of the collection of statistics.

19. The computer-implemented method of claim 18, wherein the parallel processing of the one or more processes of the collection of statistics comprises: assigning the collection of statistic with respect to a first one of the multiple defined data types ($c_1$-$c_n$) to at least a first one the multiple processing units; assigning the collection of statistic with respect to a second one of the defined data types ($c_1$-$c_n$) to at least a second one of the multiple processing units, wherein the first one of the multiple defined data types ($c_1$-$c_n$) is different than the second one of the multiple defined data types ($c_1$-$c_n$), and the first one the multiple processing units is different than the second one of the multiple processing units.

20. A commuting system that includes one or more processors configured to determine a representative data type for a data set (D) of a database configured to be accessed by a database system, wherein that data stored in the database includes a data set (D), wherein data set (D) of the database includes a plurality of data ($d_1$-$d_d$), and wherein the one or more processors are further configured to:

obtain a set of statistics(S) that includes multiple-parameter statistical values ($s_1$-$s_m$) for each one of multiple data types ($c_1$-$c_n$) in a set of data types (C) defined for the plurality of data components ($d_1$-$d_d$) of the data set (D) of the database, such that each one the multiple parameter statistical values ($s_1$-$s_m$) is associated with at least one of the multiple data types ($c_1$-$c_n$) in the defined set of data types (C);

obtain multiple selection value parameters ($v_1$-$v_v$) configured for selection of one or more target data types from the multiple data types ($c_1$-$c_n$) in the defined set of data types (C) for the data set (D) of the database, wherein each one of the selection value parameters ($v_1$-$v_v$) is defined with respect to at least one of the multiple-parameter statistical values ($s_1$-$s_m$) in the obtained set of set of statistics(S);

determine, based on the obtained selection value parameters ($v_1$-$v_v$) and the obtained multiple-parameter statistical values ($s_1$-$s_m$) for each one of multiple data types ($c_1$-$c_n$) in the defined set of data types (C), at least one representative data type (r) for the data set (D) of the database, thereby determining the representative data type for the data set (D) based on multiple section parameters and multiple statistical values provided for the defined set of data types (C);

and output the determined representative data type as the representative data type (r) for the data set (D) of the database.

21. A non-transitory computer readable storage medium storing at least executable computer code configured to determine a representative data type for a data set (D) of a database configured to be accessed by a database system, wherein that data stored in the database includes a data set (D), wherein data set (D) of the database includes a plurality of data ($d_1$-$d_d$), and wherein the computer code is further configured to:

obtain a set of statistics(S) that includes multiple-parameter statistical values ($s_1$-$s_m$) for each one of multiple data types ($c_1$-$c_n$) in a set of data types (C) defined for the plurality of data components ($d_1$-$d_d$) of the data set (D) of the database, such that each one the multiple parameter statistical values ($s_1$-$s_m$) is associated with at least one of the multiple data types ($c_1$-$c_n$) in the defined set of data types (C);

obtain multiple selection value parameters ($v_1$-$v_v$) configured for selection of one or more target data types from the multiple data types ($c_1$-$c_n$) in the defined set of data types (C) for the data set (D) of the database, wherein each one of the selection value parameters ($v_1$-$v_v$) is defined with respect to at least one of the multiple-parameter statistical values ($s_1$-$s_m$) in the obtained set of set of statistics(S);

determine, based on the obtained selection value parameters ($v_1$-$v_v$) and the obtained multiple-parameter statistical values ($s_1$-$s_m$) for each one of multiple data types ($c_1$-$c_n$) in the defined set of data types (C), at least one representative data type (r) for the data set (D) of the database, thereby determining the representative data type for the data set (D) based on multiple section parameters and multiple statistical values provided for the defined set of data types (C); and output the determined representative data type as the representative data type (r) for the data set (D) of the database.

* * * * *